United States Patent
Ji et al.

(10) Patent No.: US 12,501,402 B2
(45) Date of Patent: Dec. 16, 2025

(54) PAGING MESSAGE COMMUNICATION IN A NON-TERRESTRIAL NETWORK

(71) Applicant: QUALCOMM Incorporated, San Diego, CA (US)

(72) Inventors: Lianghai Ji, San Diego, CA (US); Huilin Xu, Temecula, CA (US); Linhai He, San Diego, CA (US); Liangping Ma, San Diego, CA (US); Qiang Wu, San Diego, CA (US); Jun Ma, San Diego, CA (US); Mohamad Sayed Hassan, Paris (FR); Mehmet Izzet Gurelli, San Diego, CA (US); Weimin Duan, San Diego, CA (US); Karthik Anantha Swamy, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 350 days.

(21) Appl. No.: 17/902,693

(22) Filed: Sep. 2, 2022

(65) Prior Publication Data

US 2024/0080800 A1 Mar. 7, 2024

(51) Int. Cl.
*H04W 68/02* (2009.01)
*H04W 4/021* (2018.01)

(52) U.S. Cl.
CPC .......... *H04W 68/02* (2013.01); *H04W 4/021* (2013.01)

(58) Field of Classification Search
CPC ..... H04W 68/02; H04W 4/021; H04W 76/30; H04W 68/00
See application file for complete search history.

(56) References Cited

U.S. PATENT DOCUMENTS

| 6,490,258 B1* | 12/2002 | Quinquis | H04W 36/326 |
| | | | 455/442 |
| 10,924,977 B2* | 2/2021 | Kumar | H04B 7/18565 |
| 2018/0175932 A1* | 6/2018 | Lucky | H04B 7/2041 |

(Continued)

OTHER PUBLICATIONS

3GPP : "3rd Generation Partnership Project, Technical Specification Group Services and System Aspects, Release 17 Description, Summary of Rel-17 Work Items", 3GPP Standard, Technical Report, 3GPP TR 21.917, V0.8.0, Mobile Competence Centre, 650, Route Des Lucioles, F-06921 Sophia-Antipolis Cedex, France No. Aug. 12, 2022, 147 Pages, XP052210601, p. 44, Last Line—p. 80, Line 5.

(Continued)

*Primary Examiner* — Kenneth T Lam
(74) *Attorney, Agent, or Firm* — Holland & Hart LLP/Qualcomm Incorporated

(57) ABSTRACT

Methods, systems, and devices for wireless communications are described. A user equipment (UE) may release a connection with a first network entity and determine a first virtual coverage area of the UE based on a geographic location of the UE associated with the release of the connection. The UE may obtain a message that includes area information. The area information may be indicative of one or more second virtual coverage areas, which the UE may use in determining whether to monitor for a paging early indication (PEI). Based on the first virtual coverage area and the one or more second virtual coverage areas may monitor for a paging message, such as the PEI or downlink control information (DCI) associated with a paging occasion.

37 Claims, 19 Drawing Sheets

(56) References Cited

U.S. PATENT DOCUMENTS

| | | | | |
|---|---|---|---|---|
| 2018/0376452 A1* | 12/2018 | Wei | .................. | H04W 88/04 |
| 2019/0253952 A1* | 8/2019 | Kumar | .................. | H04W 76/20 |
| 2020/0059295 A1* | 2/2020 | Kumar | .................. | H04W 48/04 |
| 2020/0100210 A1* | 3/2020 | Vaidya | .................. | H04W 68/02 |
| 2023/0093248 A1* | 3/2023 | Kim | .................. | H04W 52/028 |
| | | | | 455/458 |
| 2023/0262837 A1* | 8/2023 | Hao | .................. | H04W 76/27 |
| | | | | 370/329 |
| 2024/0267886 A1* | 8/2024 | Li | .................. | H04W 68/02 |
| 2024/0323917 A1* | 9/2024 | Li | .................. | H04W 76/27 |

OTHER PUBLICATIONS

International Search Report and Written Opinion—PCT/US2023/072158—ISA/EPO—Dec. 5, 2023.

3GPP: "3rd Generation Partnership Project, Technical Specification Group Radio Access Network, NR; User Equipment (UE) Procedures in Idle Mode and RRC Inactive State (Release 17)", 3GPP TS 38.304 V17.1.0, Jun. 2022, 10 Pages.

3rd Generation Partnership Project; Technical Specification Group Radio Access Network; NR; User Equipment (UE) procedures in Idle mode and RRC Inactive state (Release 17).

* cited by examiner

PAGING MESSAGE COMMUNICATION IN A NON-TERRESTRIAL NETWORK

INTRODUCTION

The following relates to wireless communications, including managing paging communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a user equipment (UE) is described. The method may include communicating a connection release message to release a first connection for the UE, where a geographic location of the UE associated with the release of the first connection corresponds to a first virtual coverage area associated with a geographic coverage area. The method may further include obtaining a message including area information indicative of one or more second virtual coverage areas that is associated with a paging early indication (PEI) for one or more paging occasions associated with the one or more second virtual coverage areas. The method may further include monitoring for a paging message based on the first virtual coverage area of the UE and the one or more second virtual coverage areas.

An apparatus for wireless communication at a UE is described. The apparatus may include a processor and memory coupled with the processor. The processor may be configured to communicate a connection release message to release a first connection for the UE, where a geographic location of the UE associated with the release of the first connection corresponds to a first virtual coverage area associated with a geographic coverage area. The processor may be further configured to obtain a message including area information indicative of one or more second virtual coverage areas that is associated with a PEI for one or more paging occasions associated with the one or more second virtual coverage areas. The processor may be further configured to monitor for a paging message based on the first virtual coverage area of the UE and the one or more second virtual coverage areas.

Another apparatus for wireless communication at a UE is described. The apparatus may include means for communicating a connection release message to release a first connection for the UE, where a geographic location of the UE associated with the release of the first connection corresponds to a first virtual coverage area associated with a geographic coverage area. The apparatus may further include means for obtaining a message including area information indicative of one or more second virtual coverage areas that is associated with a PEI for one or more paging occasions associated with the one or more second virtual coverage areas. The apparatus may further include means for monitoring for a paging message based on the first virtual coverage area of the UE and the one or more second virtual coverage areas.

A non-transitory computer-readable medium storing code for wireless communication at a UE is described. The code may include instructions executable by a processor to communicate a connection release message to release a first connection for the UE, where a geographic location of the UE associated with the release of the first connection corresponds to a first virtual coverage area associated with a geographic coverage area. The code may further include instructions executable by the processor to obtain a message including area information indicative of one or more second virtual coverage areas that is associated with a PEI for one or more paging occasions associated with the one or more second virtual coverage areas. The code may further include instructions executable by the processor to monitor for a paging message based on the first virtual coverage area of the UE and the one or more second virtual coverage areas.

In some examples of the method, apparatuses, and non-transitory computer-readable medium described herein, the area information may include an indication of the one or more second virtual coverage areas. In some examples of the method, apparatuses, and non-transitory computer-readable medium described herein, monitoring for the paging message may include operations, features, means, or instructions for monitoring for the PEI based on the first virtual coverage area being included in the one or more second virtual coverage areas.

In some examples of the method, apparatuses, and non-transitory computer-readable medium described herein, the area information may include an indication of the one or more second virtual coverage areas. In some examples of the method, apparatuses, and non-transitory computer-readable medium described herein, monitoring for the paging message may include operations, features, means, or instructions for monitoring for downlink control information (DCI) associated with a paging occasion based on the first virtual coverage area being excluded from the one or more second virtual coverage areas.

In some examples of the method, apparatuses, and non-transitory computer-readable medium described herein, the area information may include an indication to monitor for the PEI based on a current virtual coverage area of the UE. In some examples of the method, apparatuses, and non-transitory computer-readable medium described herein, monitoring for the paging message may include operations, features, means, or instructions for monitoring for the PEI based on the first virtual coverage area being the same as the one or more second virtual coverage areas, the one or more second virtual coverage areas corresponding to a current geographic location of the UE.

In some examples of the method, apparatuses, and non-transitory computer-readable medium described herein, the area information may include an indication to monitor for the PEI based on a current virtual coverage area of the UE. In some examples of the method, apparatuses, and non-transitory computer-readable medium described herein, monitoring for the paging message may include operations, features, means, or instructions for monitoring for DCI associated with a paging occasion based on the first virtual coverage area being different than the one or more second virtual coverage areas, the one or more second virtual coverage areas corresponding to a current geographic location of the UE.

In some examples of the method, apparatuses, and non-transitory computer-readable medium described herein, the area information may include a last-used-virtual-coverage-area-only indication associated with the PEI. In some examples of the method, apparatuses, and non-transitory computer-readable medium described herein, monitoring for the paging message may include operations, features, means, or instructions for monitoring for the PEI or DCI associated with a paging occasion based on the last-used-virtual-coverage-area-only indication and whether the first virtual coverage area may be the same as the one or more second virtual coverage areas, the one or more second virtual coverage areas corresponding to a current geographic location of the UE.

In some examples of the method, apparatuses, and non-transitory computer-readable medium described herein, monitoring for the paging message may include operations, features, means, or instructions for monitoring for the PEI or DCI associated with a paging occasion based on whether a first index of the first virtual coverage area corresponds to a second index associated with the one or more second virtual coverage areas.

In some examples of the method, apparatuses, and non-transitory computer-readable medium described herein, at least one of the first virtual coverage area of the UE and the one or more second virtual coverage areas may be determined using a function that maps geographic locations to a respective virtual coverage area.

Some examples of the method, apparatuses, and non-transitory computer-readable medium described herein may further include operations, features, means, or instructions for obtaining a control message that indicates the function that maps geographic locations to the respective virtual coverage area.

Some examples of the method, apparatuses, and non-transitory computer-readable medium described herein may further include operations, features, means, or instructions for establishing a second connection for the UE, where the area information may be obtained based on the establishment of the second connection.

In some examples of the method, apparatuses, and non-transitory computer-readable medium described herein, the first virtual coverage area may be a first virtual cell or a first virtual beam and the one or more second virtual coverage areas may be one or more second virtual cells or one or more second virtual beams.

In some examples of the method, apparatuses, and non-transitory computer-readable medium described herein, monitoring for the paging message may include operations, features, means, or instructions for monitoring for a WUS based on the first virtual coverage area being included in the one or more second virtual coverage areas.

In some examples of the method, apparatuses, and non-transitory computer-readable medium described herein, the message including the area information may be a broadcast message.

In some examples of the method, apparatuses, and non-transitory computer-readable medium described herein, the message including the area information may be a multicast message.

A method for wireless communication at a network entity is described. The method may include communicating a connection release message to release a first connection for communication between the network entity and a first UE, where a first virtual coverage area associated with the release of the first connection corresponds to a geographic coverage area. The method may further include outputting a message including area information indicative of one or more second virtual coverage areas that is associated with a PEI. The method may further include outputting a paging message to one or more UEs based on respective virtual coverage areas of the one or more UEs and the one or more second virtual coverage areas.

An apparatus for wireless communication at a network entity is described. The apparatus may include a processor and memory coupled with the processor. The processor may be configured to communicate a connection release message to release a first connection for communication between the network entity and a first UE, where a first virtual coverage area associated with the release of the first connection corresponds to a geographic coverage area. The processor may be further configured to output a message including area information indicative of one or more second virtual coverage areas that is associated with a PEI. The processor may be further configured to output a paging message to one or more UEs based on respective virtual coverage areas of the one or more UEs and the one or more second virtual coverage areas.

Another apparatus for wireless communication at a network entity is described. The apparatus may include means for communicating a connection release message to release a first connection for communication between the network entity and a first UE, where a first virtual coverage area associated with the release of the first connection corresponds to a geographic coverage area. The apparatus may further include means for outputting a message including area information indicative of one or more second virtual coverage areas that is associated with a PEI. The apparatus may further include means for outputting a paging message to one or more UEs based on respective virtual coverage areas of the one or more UEs and the one or more second virtual coverage areas.

A non-transitory computer-readable medium storing code for wireless communication at a network entity is described. The code may include instructions executable by a processor to communicate a connection release message to release a first connection for communication between the network entity and a first UE, where a first virtual coverage area associated with the release of the first connection corresponds to a geographic coverage area. The code may further include instructions executable by the processor to output a message including area information indicative of one or more second virtual coverage areas that is associated with a PEI. The code may further include instructions executable by the processor to output a paging message to one or more UEs based on respective virtual coverage areas of the one or more UEs and the one or more second virtual coverage areas.

In some examples of the method, apparatuses, and non-transitory computer-readable medium described herein, the area information may include an indication of the one or more second virtual coverage areas. In some examples of the method, apparatuses, and non-transitory computer-readable medium described herein, outputting the paging message may include operations, features, means, or instructions for outputting the PEI to the one or more UEs based on the respective virtual coverage areas being included in the one or more second virtual coverage areas, where the one or more UEs include the first UE or exclude the first UE based on whether the first virtual coverage area may be the same as the second virtual coverage area.

In some examples of the method, apparatuses, and non-transitory computer-readable medium described herein, the area information may include an indication of the one or more second virtual coverage areas. In some examples of the method, apparatuses, and non-transitory computer-readable medium described herein, outputting the paging message may include operations, features, means, or instructions for outputting DCI associated with a paging occasion to the one or more UEs based on the respective virtual coverage areas being excluded from the one or more second virtual coverage areas.

In some examples of the method, apparatuses, and non-transitory computer-readable medium described herein, the area information may include an indication to monitor for the PEI based on a current virtual coverage area. In some examples of the method, apparatuses, and non-transitory computer-readable medium described herein, outputting the paging message may include operations, features, means, or instructions for outputting the PEI based on the respective virtual coverage areas being the same as the one or more second virtual coverage areas.

In some examples of the method, apparatuses, and non-transitory computer-readable medium described herein, the area information may include an indication to monitor for the PEI based on a current virtual coverage area. In some examples of the method, apparatuses, and non-transitory computer-readable medium described herein, outputting the paging message may include operations, features, means, or instructions for outputting DCI associated with a paging occasion based on the respective virtual coverage areas being different than the one or more second virtual coverage areas.

In some examples of the method, apparatuses, and non-transitory computer-readable medium described herein, the area information may include last-used-virtual-coverage-area-only indication associated with the PEI. In some examples of the method, apparatuses, and non-transitory computer-readable medium described herein, outputting the paging message may include operations, features, means, or instructions for outputting the PEI or DCI associated with a paging occasion based on the last-used-virtual-coverage-area-only indication and whether the respective virtual coverage areas may be the same as the one or more second virtual coverage areas.

In some examples of the method, apparatuses, and non-transitory computer-readable medium described herein, outputting the paging message may include operations, features, means, or instructions for outputting the PEI or DCI associated with a paging occasion based on whether a first index of the respective virtual coverage areas corresponds to a second index associated with the one or more second virtual coverage areas.

In some examples of the method, apparatuses, and non-transitory computer-readable medium described herein, at least one of the respective virtual coverage areas of the one or more UEs and the one or more second virtual coverage areas may be determined using a function that maps geographic locations to virtual coverage areas.

Some examples of the method, apparatuses, and non-transitory computer-readable medium described herein may further include operations, features, means, or instructions for outputting, to the first UE, the one or more UEs, or both, a control message that indicates a function that maps geographic locations to virtual coverage areas.

Some examples of the method, apparatuses, and non-transitory computer-readable medium described herein may further include operations, features, means, or instructions for outputting an indication of a geographic location of the first UE to a second network entity.

In some examples of the method, apparatuses, and non-transitory computer-readable medium described herein, outputting the paging message may include operations, features, means, or instructions for outputting a WUS based on the respective virtual coverage areas being included in the one or more second virtual coverage areas.

In some examples of the method, apparatuses, and non-transitory computer-readable medium described herein, the respective virtual coverage areas may be virtual cells or virtual beams and the one or more second virtual coverage areas may be one or more second virtual cells or one or more second virtual beams.

In some examples of the method, apparatuses, and non-transitory computer-readable medium described herein, the message including the area information may be a broadcast message.

In some examples of the method, apparatuses, and non-transitory computer-readable medium described herein, the message including the area information may be a multicast message.

DETAILED DESCRIPTION

Figure 1:
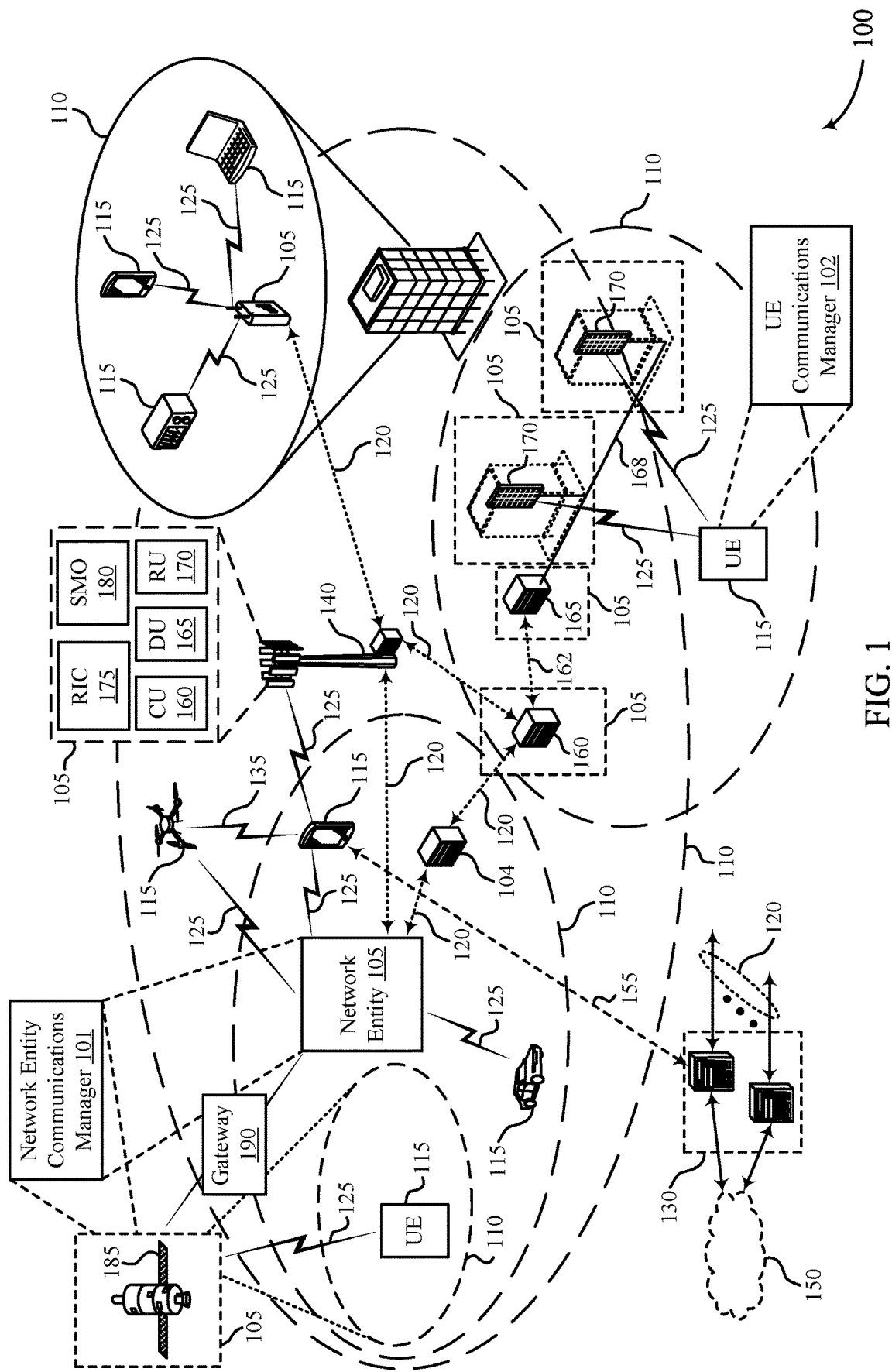
FIG. 1 illustrates an example of a wireless communications system that supports paging message communication in a non-terrestrial network (NTN) in accordance with one or more aspects of the present disclosure.

Some wireless communications systems may support the communication of a paging early indication (PEI), for example, to reduce power consumption. For example, a PEI may be a paging message that indicates whether a UE should monitor an upcoming paging occasion. A paging occasion may be a time interval during which a UE may monitor for a paging message (e.g., downlink control information (DCI) and/or a corresponding payload over the physical downlink shared channel (PDSCH) scheduled by the DCI). The paging message may trigger a radio resource control (RRC) setup, such as an RRC request to establish or resume an RRC connection (e.g., enter an RRC connected state). The PEI may indicate one or more paging subgroups that are to monitor the upcoming paging occasion. For example, the UE may be configured to be associated with (e.g., be included in) a particular paging subgroup of a set of paging subgroups. If the UE receives a PEI that indicates the paging subgroup associated with the UE, the UE may monitor the upcoming paging occasion for the control information (e.g. the paging message). If the UE fails to detect the PEI or the PEI indicates that the paging subgroup configured for the UE does not need to monitor the upcoming paging occasion, the UE may skip (e.g., refrain from) monitoring the paging occasion. Accordingly, communication of a PEI may enable a UE to skip monitoring paging occasions during which information for the UE is not communicated and instead operate in a lower power state (e.g., power down one or more components associated with monitoring paging occasions), thereby reducing power consumption at the UE.

In some cases, a network entity may transmit an indication (e.g., a lastUsedCellOnly indication) to UEs within a cell served by the network entity to indicate that the UEs should monitor for a PEI only if a last connection of the UEs was released by the cell (e.g., by the network entity). As such, if the last connection of a UE was released by a different cell (e.g., a different network entity) than the cell with which the UE is currently connected, the UE may skip monitoring for a PEI and may instead monitor a paging occasion for the UE. In some communication scenarios, however, communicating such an indication may reduce efficiency and power savings associated with communicating PEIs. For example, in an NTN, a cell may be served by a moving network entity (e.g., a non-terrestrial network entity that is a non-earth-bound or flying network entity, such as a satellite, a balloon, or a drone, among other types of non-terrestrial network entities). Because of the movement of the network entity, a geographic coverage area of the cell served by the network entity (e.g., the geographic area served by the network entity) may also move over time. Accordingly, a UEs serving cell may change over time as, for example, a first network entity that serves a first geographic coverage area in which the UE is located moves to serve a second geographic coverage area, and a second network entity moves to replace the first network entity and serve the first geographic coverage area.

Such network entity movement may, in some cases, result in low efficiency implementation of using PEIs. For example, the UE may establish a connection with a first cell associated with the first network entity. The first network entity may move over time, and thus a geographic coverage area of the first cell may also move over time. The UE's connection with a first cell associated with the first network entity may be released, and the first network entity (e.g., the first cell) may continue to move. As a result of the movement, the UE may subsequently establish a connection with a second cell associated with the second network entity (e.g. camp on the second cell). For example, the first cell may move and serve a second geographic coverage area, and the second network entity may move to serve the first geographic coverage area. Accordingly, the UE may camp on the second cell. However, if the second network entity transmits a lastUsedCellOnly indication to UEs in the first geographic coverage area, the UEs in the first geographic coverage area now served by the second cell may refrain from monitoring for a PEI based on their last connection being released by the first cell and instead monitor associated paging occasions. Additionally or alternatively, some UEs previously served and/or released by the second cell may no longer be served by the second cell due to the movement of the second network entity. Thus a PEI transmitted by the second network entity may not reach these previously served UEs, thereby resulting in wasted signaling of PEIs that do not reach the previously served UEs, increased monitoring of paging occasions intended to be skipped by the previously served UEs based on now being served by a different cell, or both.

Techniques, systems, and devices described herein support efficient PEI communication and paging message monitoring in NTNs such that power consumption and signaling overhead may be reduced. For example, a UE may communicate with a network via a connection with a first cell served by a first network entity (e.g., a moving network entity). The connection with the first cell may be released (e.g., suspended), and the UE may determine its geographic location (e.g., via a global navigation satellite system (GNSS)). Using the geographic location, the UE may determine a first virtual coverage area of the UE. A virtual coverage area may be a logical entity corresponding to a geographic area (e.g., a static geographic area). For example, the first virtual coverage area may be a logical representation of a first geographic coverage area, and the UE may determine the first virtual coverage area that corresponds to the UE's determined geographic location.

The UE may subsequently camp on a serving cell, which may be the first cell or a second cell served by a second network entity. For example, if the first network entity moves such that the UE is no longer served by the first cell and the second network entity moves such that UE is served by the second cell, the UE may camp on the second cell. If the movement of the first network entity is limited such that the UE is still served by the first cell, the UE may camp on the first cell. The UE may use the first virtual coverage area to determine whether to monitor for a PEI communicated by the serving cell on which it camps (e.g., rather than based on whether the last connection of the UE), which may improve efficient PEI communication and paging message monitoring in NTNs. For example, the UE may receive area information from the serving network entity (e.g. the serving cell on which the UE camps). The area information may be indicative of one or more second virtual coverage areas and may be used in determining whether to monitor for the PEI.

For example, the area information may indicate the one or more second virtual coverage areas, and if the first virtual coverage area is included in (e.g., the same as) one of the one or more second virtual coverage areas, the UE may monitor for the PEI. Otherwise, the UE may monitor for DCI associated with a paging occasion. Alternatively or additionally, the area information may include an indication to monitor for the PEI based on a current virtual coverage of the UE (e.g., a last-used indication). Here, the UE may determine its current virtual coverage area based on its current geographic location, and if the current virtual coverage area is the same as the first virtual coverage area (e.g., if the UE has not moved more than a threshold such that its virtual coverage area changes between the connection release and the reception of the area information), the UE may monitor for the PEI. Otherwise, the UE may monitor for the DCI associated with the paging occasion.

By monitoring for paging messages (e.g., PEIs, DCI associated with a paging occasion) in accordance with virtual coverage areas (e.g., rather than last-used cells), PEIs may be efficiently implemented in an NTN such that power consumption may be reduced and communication resource efficiency may be increased. For example, by communicating a PEI based on a virtual coverage area of the UE, PEIs may be correctly communicated and monitored even if a UE's serving cell changes due to network entity movement. As a result, the UE may correctly monitor for PEIs and skip monitoring some paging occasions (e.g. according to the outcome of PEI monitoring), which will reduce power consumption. Additionally, transmitting PEIs based on UE virtual coverage areas may reduce the transmission of PEIs that are undetectable by target UEs due to network entity movement, for example, by preventing a moving network entity from attempting to transmit PEIs previous but now unserved UEs. As a result, wasted signaling of undetectable PEIs may be reduced and communication resource utilization efficiency may be increased based on the wasted signaling reduction.

Aspects of the disclosure are initially described in the context of wireless communications systems and a network architecture. Aspects of the disclosure are additionally described in the context of a process flow. Aspects of the disclosure are further illustrated by and described with reference to apparatus diagrams, system diagrams, and flowcharts that relate to paging message communication in an NTN.

FIG. 1 illustrates an example of a wireless communications system 100 that supports paging message communication in an NTN in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node, which may be referred to as a node, a network node, a network entity 105, or a wireless node, may be a base station 140 (e.g., any base station 140 described herein), a UE 115 (e.g., any UE 115 described herein), a network controller, an apparatus, a device, a computing system, one or more components, and/or another suitable processing entity configured to perform any of the techniques described herein. For example, a network node may be a UE 115. As another example, a network node may be a network entity 105 or a base station 140. As another example, a first network node may be configured to communicate with a second network node or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples. Similarly, reference to a UE 115, base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station also discloses that a first network node is configured to receive information from a second network node), the broader example of the narrower example may be interpreted in the reverse, but in a broad open-ended way. In the example above where a UE 115 being configured to receive information from a base station 140 also discloses that a first network node being configured to receive information from a second network node, the first network node may refer to a first UE 115, a first base station 140, a first apparatus, a first device, a first computing system, a first one or more components, a first processing entity, or the like configured to receive the information; and the second network node may refer to a second UE 115, a second base station 140, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support paging message communication in an NTN as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol).

In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5GNR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support NTN communications between network nodes of the wireless communications system 100. For example, the wireless communications system 100 may be an example of an NTN that supports communications between non-terrestrial network nodes and terrestrial network nodes. For instance, as described herein, a network entity 105 may refer to a terrestrial communication device (such as a base station 140) or a non-terrestrial communication device (such as a satellite 185, a balloon, a drone, a high-altitude platform station, or another non-terrestrial device). A non-terrestrial network entity 105 may be connected to (e.g., communicate with) a terrestrial network entity 105 via a gateway 190. In some examples, a non-terrestrial network entity 105 may correspond to a first cell type (e.g., an NTN cell type), and a terrestrial network entity 105 may correspond to a second cell type (e.g., a terrestrial (TN) cell type) different from the first cell type.

In some examples, a non-terrestrial network entity 105 may provide coverage to areas in which a terrestrial network entity 105 may be unavailable. A channel corresponding to the non-terrestrial network entity 105 may be characterized with strong line of sight conditions, as a signal provided by the non-terrestrial network entity 105 may be reflected at the sky (e.g., as opposed to a signal corresponding to a terrestrial network entity 105 which may travel over a ground surface). A footprint of a beam radiated from the non-terrestrial network entity 105 may have a relatively clear boundary (e.g., as compared to terrestrial network entity 105 beam boundaries), and a UE 115 may be likely to operate within a single beam serving area (e.g., except in cases where a UE 115 is located at the boundary between two serving areas). In some examples, a serving area for a beam corresponding to the non-terrestrial network entity 105 may be larger than a serving area for a beam corresponding to a terrestrial network entity 105.

A non-terrestrial network entity 105, such as a satellite 185, may move over time and support various coverage scenarios. For example, the non-terrestrial network entity 105 may support a moving cell or beam coverage scenario in which the cell footprint or beam footprint moves together with the satellite 185. Alternatively, the non-terrestrial network entity 105 may support a quasi-earth fixed cell or beam coverage scenario in which the cell footprint of beam footprint remains static for a period of time as the non-terrestrial network entity 105 moves through space.

A network entity 105 may include a network entity communications manager 101 to manage communications between the network entity 105 and other devices in the wireless communications system 100. In a similar manner, a UE communications manager 102 may manage communications between a UE 115 and other devices in the wireless communications system 100.

A network entity 105 may transmit paging messages to a UE 115 to support RRC connection establishment (e.g., RRC connection resumption and/or RRC connection establishment). In some examples, the network entity 105 may support reduced power consumption by transmitting a PEI to a UE 115 to indicate whether to monitor an upcoming paging occasion. In some examples, to support reduced signaling overhead at the network entity 105, the network entity 105 may transmit a PEI to the UE 115 if a last connection of the UE 115 was released by a cell served by the network entity 105 or if a last connection of the UE 115 was released by the same cell. However, due to the movement of network entities 105 in an NTN, the serving cell of a UE 115 may change over time, for example, even if the UE 115 is a low-mobility or static UE 115. As such, transmitting PEIs in accordance with a last serving cell connection of the UE 115 may result in the low efficiency usage of PEIs and reduced power savings.

In accordance with examples described herein, a UE 115 and a network entity 105 may determine whether to communicate a PEI based on a virtual coverage area of the UE 115. For example, in association with releasing a first connection for the UE 115 with a first cell served by a first network entity 105, the UE 115 may determine a first virtual coverage of the UE 115 based on a geographic location of the UE 115. The UE 115 may camp on a serving cell (e.g., the first cell or a second cell served by a second network entity 105 based on a movement of the first and second network entities 105) and receive area information that is indicative of one or more second virtual coverage areas. If the first virtual coverage area is included in or the same as at least one of the one or more second virtual coverage areas, the UE 115 may determine to the monitor for a PEI, and the serving network entity 105 may determine to transmit the PEI to the UE 115. If the first virtual coverage area is excluded from or different from the one or more second virtual coverage areas, the UE 115 may determine to skip monitoring for the PEI and instead monitor the paging occasion for DCI, and the serving network entity 105 may determine to skip transmitting the PEI to the UE 115 and instead transmit the DCI during the paging occasion.

Figure 2:
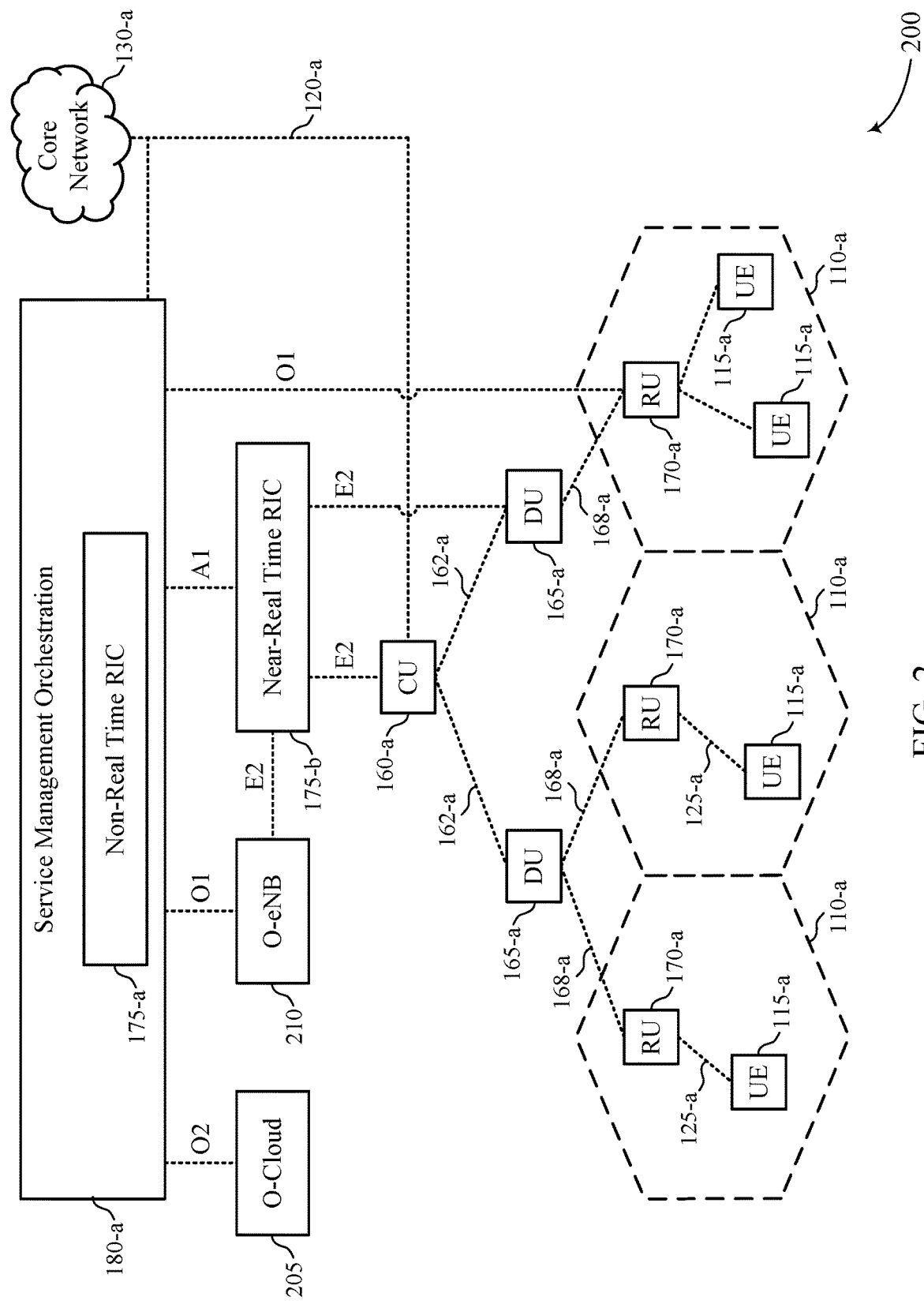
FIG. 2 illustrates an example of a network architecture that supports paging message communication in an NTN in accordance with one or more aspects of the present disclosure.

FIG. 2 illustrates an example of a network architecture 200 (e.g., a disaggregated base station architecture, a disaggregated RAN architecture) that supports paging message communication in an NTN in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., AI policies).

In accordance with examples described herein, a UE 115-*a* may determine whether to monitor for a PEI based on a virtual coverage area of the UE 115-*a*. For example, the UE 115-*a* may release a first connection with a first cell served by a first network entity 105 (e.g., via a first RU 170-*a*). Based on the connection release, the UE 115-*a* may determine a first virtual coverage of the UE 115-*a* based on a geographic location of the UE 115-*a*. The UE 115-*a* may camp on a serving cell, such as the first cell or a second cell served by a second network entity 105 (e.g., via a second RU 170-*a*) based on a movement of the first and second network entities 105 (e.g., the first and second Rus 170-*a*). Based on the camping, the UE 115-*a* may receive area information that is indicative of one or more second virtual coverage areas. If the first virtual coverage area is included in or the same as at least one of the one or more second virtual coverage areas, the UE 115-*a* may determine to the monitor for a PEI, and the serving network entity 105 may determine to transmit the PEI (e.g., via the serving RU 170-*a*). If the first virtual coverage area is excluded from or different from the one or more second virtual coverage areas, the UE 115-*a* may determine to skip monitoring for the PEI and instead monitor the paging occasion for DCI, and the serving network entity 105 may determine to skip transmitting the PEI to the UE 115-*a* and instead transmit the DCI during the paging occasion.

Figure 3A:
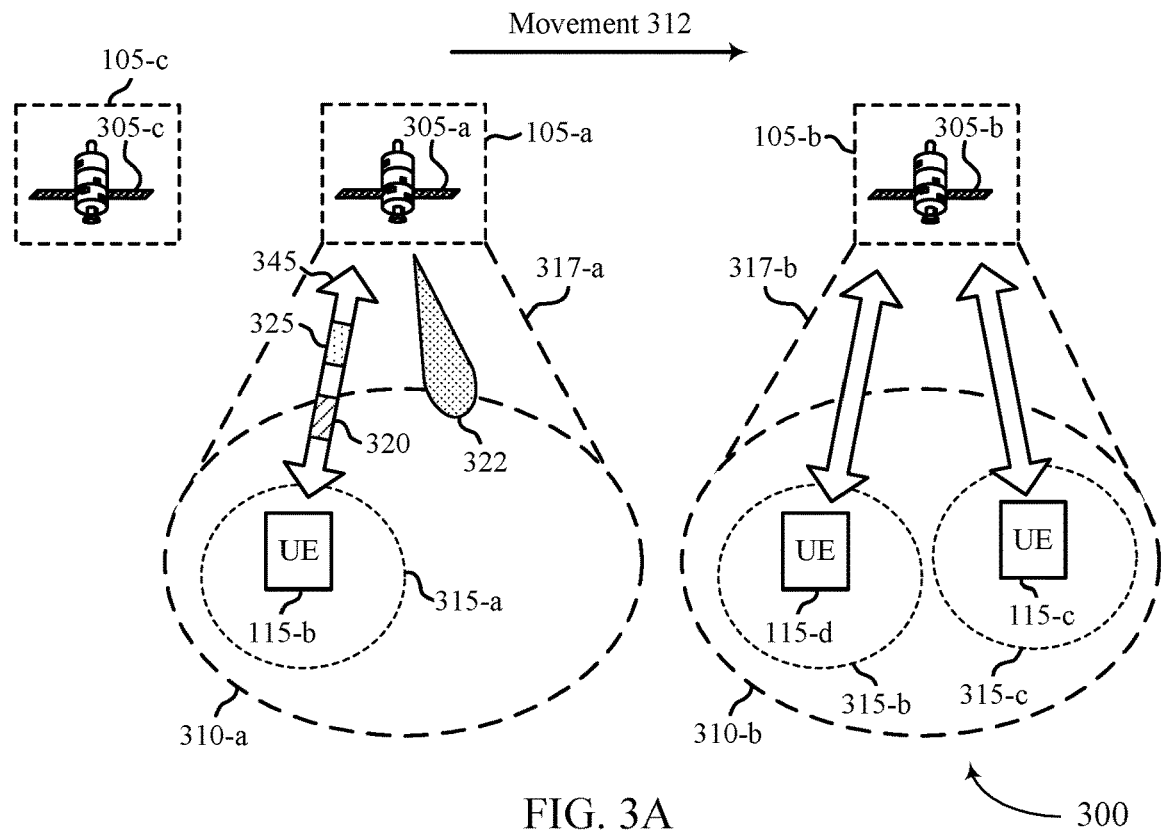
FIGS. 3A and 3B illustrate an example of a wireless communications system that supports paging message communication in an NTN in accordance with one or more aspects of the present disclosure.
Figure 3B:
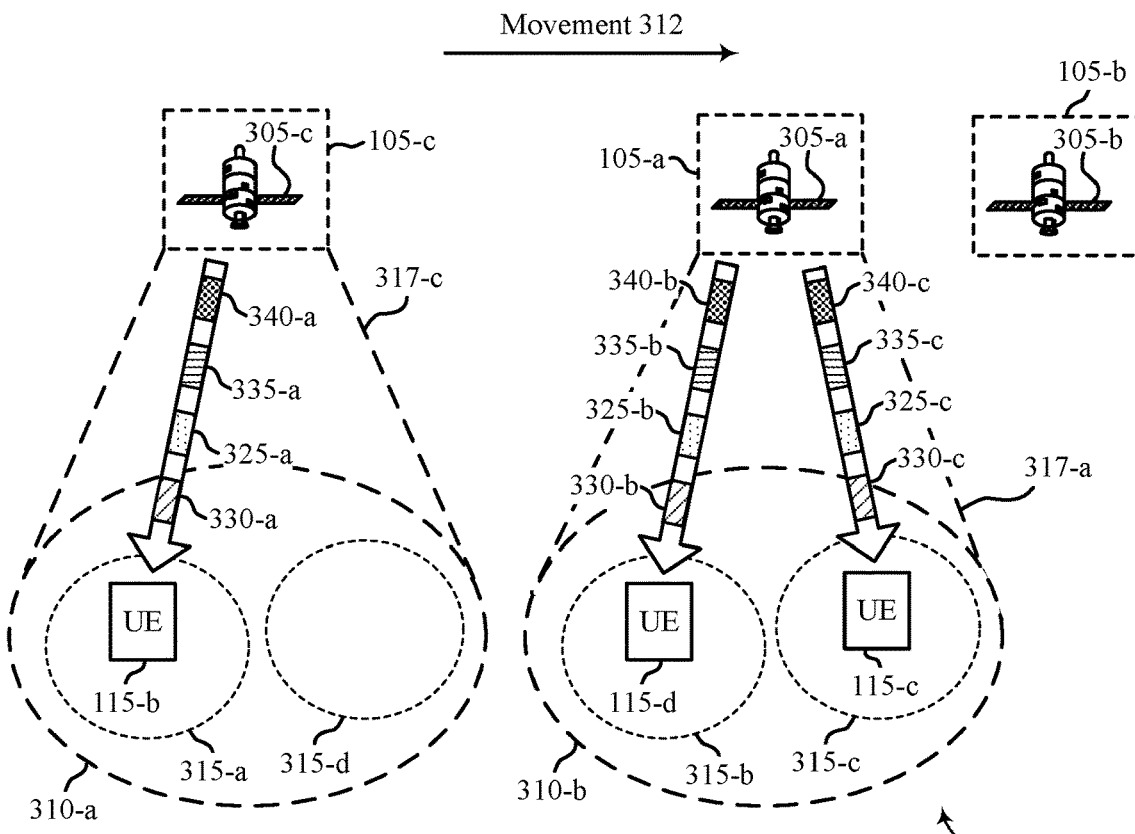

FIGS. 3A and 3B illustrate an example of a wireless communications system 300 that supports paging message communication in an NTN in accordance with one or more aspects of the present disclosure. The wireless communications system 300 may be an example of a wireless communications system 100 as described herein with reference to FIG. 1. In some examples, the wireless communications system 300 may include a network architecture 200 as described with reference to FIG. 2. The wireless communications system 300 may include a UEs 115 and network entities 105, which may be examples of corresponding devices described with reference to FIGS. 1 and 2. In some examples, the network entities 105 may be examples of non-terrestrial network entities 105, such as satellites 305.

The wireless communications system 300 may support communications between the UEs 115 and the network entities 105. For example, the UEs 115 may communicate with respective network entities 105 via respective communication links 345, which may be examples of communication links 125 described with reference to FIGS. 1 and 2. The UEs 115 and the network entities 105 may support beamformed communications, for example, using respective beams 322.

FIGS. 3A and 3B depict the wireless communications system 300 at a different periods of time. For example, FIG. 3A may depict the wireless communications system 300 during a first period of time, and FIG. 3B may depict the wireless communications system during a second period of time after the first period time. For instance, the wireless communications system 300 may include a UE 115-*b*, a UE 115-*c*, and a UE 115-*d*. The UE 115-*b* may be located within a coverage area 310-*a*, and the UEs 115-*c* and 115-*d* may be located within a coverage area 310-*b*, which may be examples of a coverage areas 110 described with reference to FIGS. 1 and 2. The cell that serves the coverage areas 310-*a* and 310-*b* may change over time. For example, the wireless communications system 300 may be an example of an NTN in which the network entities 105 may move over time. For instance, the network entities 105 may move over time according to movement 312.

In the example of FIG. 3A corresponding to the wireless communications system 300 during the first period of time, a network entity 105-*a* (e.g., a satellite 305-*a*) associated with a first cell 317-*a* may serve the UEs 115 located in coverage area 310-*a* (e.g., the UE 115-*b*), and a network entity 105-*b* (e.g., a satellite 305-*b*) associated with a second cell 317-*b* may serve the UEs 115 located in the coverage area 310-*b* (e.g., the UEs 115-*c* and 115-*d*). In the example of FIG. 3B corresponding to the wireless communications system during the second period of time, the network entities 105 of the wireless communications system 300 may have moved such that the network entity 105-*a* serves the UEs 115 located in the coverage area 310-*b*, and a network entity 105-*c* (e.g., a satellite 305-*c*) associated with a third cell 317-*c* may serve the UEs 115 located in the coverage area 310-*a*. For example, the movement 312 of the network entities 105 from the first time period to the second time period may be great enough such that Referring the FIG. 3A, during the first period of time, the UEs 115 may release (e.g., suspend) respective connections with respective cells. For example, the UE 115-*b* and the network entity 105-*a* may communicate a connection release message 320 to release a connection for the UE 115-*b* with the first cell served by the network entity 105-*a* (e.g., a connection between the UE 115-*b* and the network entity 105-*a*). In other words, the UE 115-*b*'s connection may be released by the first cell. Similarly, the UEs 115-*c* and 115-*d* may communicate respective connection release messages 320 to release respective connections with the second cell served by the network entity 105-*b*.

Based on the connection release, the UEs 115 may determine respective virtual coverage areas 315 of the UEs 115. For example, the UE 115-*b* may determine its geographic location (e.g., via a GNSS, among other techniques for determining geographic locations) at a time of the connection release and determine the virtual coverage area 315-*a* based on the determined geographic location of the UE 115-*b*. That is, the UE 115-*b* may determine its geographic location in response to or as part of the connection release and determine the virtual coverage area 315-*a* corresponding to the determined geographic location. For instance, the virtual coverage areas 315 may be logical representations of geographic areas (e.g., geographic coverage areas) that may be used, for example, in determining whether to monitor for a PEI. Accordingly, the UE 115-*b* may determine the virtual coverage area 315-*a*, for example, by determining that its geographic location is within the geographic coverage area corresponding to the virtual coverage area 315-*a*. Similarly, the UEs 115-*c* and 115-*d* may determine their respective geographic locations in response to or as part of the connection release. The UE 115-*c* may determine the virtual coverage area 315-*c* based on its geographic location, and the UE 115-*d* may determine the virtual coverage area 315-*b* based on its geographic location.

The network entities 105 may similarly determine the virtual coverage areas 315 of the UEs 115. For example, the network entity 105-*a* may determine that the virtual coverage area 315-*a* is associated with the UE 115-*b* (e.g., the UE 115-*b* is located in the geographic coverage area associated with the virtual coverage area 315-*a*) based on the geographic location of the UE 115-*b* associated with the connection release. That is, the network entity 105-*a* may use the geographic location of the UE 115-*b* determined in response to or as part of the connection release to determine that the UE 115-*b* is located in the geographic coverage area associated the virtual coverage area 315-*a*. Similarly, the network entity 105-*b* may determine that the virtual coverage areas 315-*b* and 315-*c* are associated with the UEs 115-*d* and 115-*c*, respectively, based on the geographic locations of the UEs 115-*d* and 115-*c* associated with the connection release.

In some examples, the network entities 105 may determine a UE's virtual coverage area based on a geographic location reported by the UE 115, and/or a geographic location of the UE 115 derived or estimated by the network entities 105. For example, the network entities 105 may determine (e.g., derive, estimate) a UE's location and/or a UE's virtual coverage area 315 based on a beam footprint area or a cell footprint area at the time associated with the connection release, where the beam footprint area or the cell footprint area corresponds to the UE's last serving beam or serving cell associated with the connection release. In another example, the network entities 105 may determine a UE's location and/or a UE's virtual coverage area 315 based on a positioning method. For instance, the network entities 105 may determine a UE's virtual coverage area 315 by communicating with or contacting a location management function, which may utilize one or more positioning methods, such as a time difference of arrival (TDOA)-based method, a multi-round trip time (multi-RTT)-based method, or both, to derive and estimate the UE's geographic location.

In the examples of FIGS. 3A and 3B, the virtual coverage areas 315 are illustrated as being smaller than the coverage areas 310-a for clarity. In some examples, a geographic coverage area associated with a virtual coverage area 315 may correspond to a coverage area of a cell 317 served by a network entity 105 (e.g., a cell footprint, for example, corresponding to a coverage area 310). For example, the geographic coverage area associated with the virtual coverage area 315-a may correspond to the coverage area 310-a. Here, the virtual coverage area 315-a may be referred to as a virtual cell. In some examples, a geographic coverage area associated with a virtual coverage area 315 may correspond to a coverage area of a beam of a network entity 105 (e.g., a beam footprint). For example, the geographic coverage area associated with the virtual coverage area 315-a may correspond to a coverage area of a beam 322 of the network entity 105-a. Here, the virtual coverage area 315-a may be referred to as a virtual beam. In some examples, a geographic coverage area associated with a virtual coverage area 315 may be independent of a cell or beam footprint. For example, the geographic coverage area associated with the virtual coverage area 315-a may correspond to a 10 kilometer (km) by 10 km square geographic area of the earth, among other geographic areas that may be configured or defined. In some examples, a cell or beam footprint may be divided into multiple virtual coverage areas 315. For example, the geographic area covered by the coverage area 310-a (e.g., corresponding to a cell footprint) may be divided (e.g., partitioned) into multiple geographic areas that each correspond to a respective virtual coverage area 315. Similarly the geographic area covered by a beam of a network entity 105 may be divided into multiple geographic areas that each correspond to a respective virtual coverage area 315.

In some examples, each virtual coverage area 315 may be associated with an identifier, such as an index which may be used to identify the virtual coverage area 315. For example, the virtual coverage area 315-a may be associated with a first index, the virtual coverage area 315-b may be associated with a second index, and the virtual coverage area 315-c may be associated with a third index. In some examples, determining a virtual coverage area 315 may include determining the associated index. For example, to determine the virtual coverage area 315-a, the UE 115-b may determine the first index based on its determined geographic location. In some examples, the UEs 115 may store (e.g., in memory at the UE 115) information associated with the determined virtual coverage areas 315. For example, the UE 115-b may store the first index, geographic coordinates associated with the virtual coverage area 315-a, and/or a combination thereof. Similarly, the UEs 115-c and 115-d may store indexes and/or geographic coordinates of the corresponding virtual coverage areas 315.

In some examples, the UEs 115 and the network entities 105 may determine the respective virtual coverage areas 315 using a function that maps geographic locations to a respective virtual coverage area 315. For example, the UE 115-b (e.g., and the network entity 105-a) may use the function to map the geographic location of the UE 115-b to the virtual coverage area 315-a (e.g., the first index of the virtual coverage area 315-a). In some examples, the function may be a defined function stored at the UEs 115 and the network entities 105-a (e.g., defined in accordance with a wireless communications standard, such as a Third Generation Partnership Project (3GPP) standard). In some examples, the function (e.g., respective functions) may be provisioned to the UEs 115 by the network entities 105. For example, in some cases, the network entities may transmit a control message 325 to the UEs 115 that indicates the function. In some examples, a network entity 105 may transmit the control message 325 during the first period of time, for example, before, after, or as part of the connection release.

Referring the FIG. 3B, the UEs 115 may establish connections with respective cells during the second period of time after releasing the previous connections during the first period of time. For example, the UE 115-b may establish a connection with the network entity 105-c (e.g., with the third cell via the network entity 105-c), and the UEs 115-c and 115-d may establish respective connections with the network entity 105-a. For instance, based on the movement 312 of the network entities 105, the coverage area 310-a may be served by the network entity 105-c and the coverage area 310-b may be served by the network entity 105-a during the second period of time, and thus the UEs 115 may establish connections with the network entities 105 that serve the corresponding coverage areas 310. In some examples, establishing a connection with a network entity 105 may include camping on a respective cell served by the network entity, for example, in an RRC idle or RRC inactive state. That is, the UEs 115 may camp on a cell and receive information from the network entities 105 without establishing an RRC connection (e.g., entering an RRC connected state) with the respective network entities 105.

The network entities 105 may transmit area information 330 to the UEs 115 that supports determining whether to communicate a PEI 335. For example, the network entity 105-c may transmit area information 330-a to the UE 115-b, and the network entity 105-a may transmit area information 330-b and area information 330-c to the UE 115-d and the UE 115-c, respectively. In some examples, the network entities 105 may broadcast area information 330 as part of a broadcast message. In some examples, the network entities may transmit area information 330 via a multicast message associated with a group of UEs 115.

The area information 330 may be indicative of one or more virtual coverage areas 315 that may be used in determining whether to communicate a PEI 335. For example, the area information 330-a may include an indication of one or more virtual coverage areas 315, such as one or more of the virtual coverage area 315-a and a virtual coverage area 315-d. The area information 330-b and 330-c may include an indication of one or more virtual coverage areas 315, such as one or more of the virtual coverage area 315-b and the virtual coverage area 315-c. In some examples, area information 330 may indicate the one or more virtual coverage areas by including a sequence of virtual coverage areas 315, such as a sequence of indexes of virtual coverage areas 315 or a sequence of geographic coordinates associated with virtual coverage areas 315. In some examples, to indicate a sequence of virtual coverage areas 315, the area information 330 may indicate a starting index and an ending index. For instance, the indexes of the virtual coverage areas 315 may be configured to have an order such that indicating a starting and ending index of the sequence may indicate a virtual coverage area 315 of the starting index through a virtual coverage area 315 of the ending index (e.g., all virtual coverage areas 315 between and including the virtual coverage areas 315 of the starting and ending indexes).

The UEs 115 and network entities 105 may determine whether to communicate a PEI 335 based on the indicated virtual coverage areas 315. For example, the UE 115-*b* and the network entity 105-*c* may determine whether to communicate a PEI 335-*a* based on whether the virtual coverage area 315 determined based on the geographic location of the UE 115-*b* associated with the connection release (e.g., the virtual coverage area 315-*a*) is included in (e.g., belongs to, is the same as) the one or more virtual coverage areas 315 indicated by the area information 330-*a*. For instance, if the area information 330-*a* indicates the virtual coverage area 315-*a* (e.g., or a virtual coverage area 315 that includes or encompasses the virtual coverage area 315-*a*), the UE 115-*b* may determine to monitor for the PEI 335-*a* based on the virtual coverage area 315 determined based on the UE 115-*b*'s location being the same as or included in at least one of the indicated virtual coverage areas 315. Additionally, or alternatively, the UE 115-*b* may determine to monitor for the PEI 335-*a* based on whether first index of the virtual coverage area 315-*a* corresponds to an indicated index. For example, the UE 115-*b* may compare the first index to the indicated indexes and if the first index corresponds to an indicated index (e.g., if the there is a match between the first index and an indicated index), the UE 115-*b* may monitor for the PEI 335-*a*.

The network entity 105-*c* may similarly determine whether the UE 115-*b* is eligible for transmission of the PEI 335-*a* to the UE 115-*b*. For example, if the virtual coverage area 315-*a* corresponds to an indicated virtual coverage area 315, the network entity 105-*c* may determine that the UE 115-*b* will monitor for the PEI 335-*a* and will thus be able to receive the PEI 335-*a*, if transmitted. The PEI 335-*a* may indicate if the UE 115-*b* is to monitor the paging occasion 340-*a*. Accordingly, if the PEI 335-*a* indicates for the UE 115-*b* to monitor the paging occasion 340-*a*, the UE 115-*b* may monitor the paging occasion 340-*a* for a paging message that includes DCI, for example, that triggers an RRC setup between the UE 115-*b* and the network entity 105-*c*. Otherwise, the UE 115-*b* may refrain from monitoring the paging occasion 340-*a*.

If, however, the virtual coverage areas 315 indicated via the area information 330-*a* exclude the virtual coverage area 315-*a* (e.g., exclude an index corresponding to the first index), the UE 115-*b* and the network entity 105-*c* may determine to not communicate the PEI 335-*a*. For example, the UE 115-*b* may refrain from monitoring for the PEI 335-*a*, and the network entity 105-*c* may refrain from transmitting the PEI 335-*a*. Instead, the UE 115-*b* may monitor the paging occasion 340-*a* for the DCI, which the network entity 105-*c* may or may not transmit.

The network entity 105-*a* and the UEs 115-*c* and 115-*d* may similarly determine whether to communicate a PEI 335 based on the indicated virtual coverage areas 315. For example, if the area information 330-*b* and 330-*c* indicate the virtual coverage area 315-*b* but exclude the virtual coverage area 315-*c*, the UE 115-*d* may determine to monitor for a PEI 335-*b*, and the UE 115-*c* may refrain from monitoring for a PEI 335-*c*. Similarly, the network entity 105-*a* may determine to the transmit the PEI 335-*b* to the UE 115-*d* and refrain from transmitting the PEI 335-*c* to the UE 115-*c*. The network entity 105-*a* may also refrain from transmitting a PEI 335 to the UE 115-*b*, for example, based on the virtual coverage area 315-*a* being excluded from the area information 330 transmitted by the network entity 105-*a*. For example, the network entity 105-*a* may determine to exclude an indication of the virtual coverage area 315-*a* from the area information 330 based on the virtual coverage area 315-*a* being outside of the coverage area 310-*b* served by the network entity 105-*a* during the second period of time.

The PEI 335-*b* may indicate whether the UE 115-*d* is to monitor an upcoming paging occasion 340-*b*. If the UE 115-*d* is to monitor the paging occasion 340-*b*, the UE 115-*d* may monitor the paging occasion for DCI transmitted by the network entity 105-*a* during the paging occasion 340-*b*. Otherwise, the UE 115-*d* may refrain from monitoring the paging occasion 340-*b*. Additionally, based on the virtual coverage area 315-*c* being excluded from the area information 330-*c*, the UE 115-*c* may monitor a paging occasion 340-*c* for DCI, which the network entity 105-*a* may or may not transmit.

Additionally or alternatively, the area information 330 may include an indication to determine whether to monitor for a PEI 335 based on a current virtual coverage area 315 of the UEs 115. For example, in some cases, a UE 115 may move between the connection release and the reception of the area information 330 (e.g., a triggering of a communication of a paging message) such that the virtual coverage area 315 associated with the UE 115 may change. For instance, if the UE 115-*b* were to have moved to a geographic location corresponding to a virtual coverage area 315-*d*, the current virtual coverage area 315 of the UE 115-*b* may be the virtual coverage area 315-*d* rather than the virtual coverage area 315-*a* associated with the UE 115-*b* at the time of the connection release. The area information 330 may indicate that if the current virtual coverage area 315 of a UE 115 is the same as the virtual coverage area 315 determined in association with the connection release, the UE 115 is to monitor for a PEI 335. However, if the current virtual area of a 315 is different than the virtual coverage area 315 determined in associated with the connection release, the area information 330 may indicate for the UE 115 to refrain from monitoring for the PEI 335 and instead monitor a paging occasion 340 for DCI.

In some examples, the indication to monitor for a PEI 335 based on a current virtual coverage area 315 of a UE 115 may be an example of a lastUsedCellOnly indication but adapted for virtual coverage areas 315. For example, if a last-used virtual coverage area 315 is the same as the current virtual coverage area 315, the UE 115 may monitor for the PEI 335. Otherwise, the UE 115 instead monitor a paging occasion 340. In some examples, the indication to monitor for a PEI 335 based on a current virtual coverage area 315 of a UE 115 may be referred to as a last-used-virtual-coverage-area-only indication, or some other moniker such as a lastUsedVirtualCellOnly indication, a lastUsedVirtualBeamOnly indication, a lastUsedVirtualAreaOnly indication, or a lastUsedVirtualCoverageAreaOnly indication, among others.

In some examples, the current geographic location of the UEs 115 may be unknown to the network entities 105. For example, if a UE 115 camps on a serving cell in an RRC idle or RRC inactive state, the current geographic location of the UE 115 may be unknown to a serving network entity 105. In some examples, the network entities 105 may assume (e.g., be configured to expect) that the current geographic location of the UEs 115 is the same as the geographic locations determined at the time of the connection releases and may thus assume that the current virtual coverage areas 315 are the same as the virtual coverage areas 315 associated with the connection releases. Accordingly, if the area information 330 includes the indication to monitor for a PEI 335 based on a current virtual coverage area 315 of a UE 115, the network entities 105 may assume that the UEs 115 are each eligible for transmission of a PEI 335 (e.g., will each be monitoring for the PEI 335) if the network entity 105 determines to transmit a PEI 335 to a respective UE 115.

In some examples, the UEs 115 may determine their respective virtual coverage areas 315 based on their geographic locations associated with the connection release during the second period of time. For instance, in some cases, the function used to map the geographic locations to a respective a virtual coverage area 315 may be provisioned during the second period of time. For example, the network entity 105-c may transmit a control message 325-a to the UE 115-b that includes the function, and the network entity 105-a may transmit a control message 325-b to the UE 115-d and a control message 325-c to the UE 115-c that each include the function (e.g., respective functions). Here, the UEs 115 may store their respective geographic locations associated with the connection releases (e.g., the geographic locations determined at the time of the connection releases) and determine the corresponding virtual coverage areas 315 based on the geographic locations using the functions provisioned via the control messages 325.

In some examples, the network entities 105 may transmit the control messages 325 as part of or in conjunction with transmitting the area information 330. For example, area information 330 may include the function indicated via a control messages 325. Alternatively, the network entities 105 may transmit a message that includes both the area information 330 and the control message 325. Alternatively, the network entities 105 may transmit the area information 330 and the control message 325 via separate messages.

In some examples, the virtual coverage areas 315 may be used to determine whether a UE 115 is to monitor for a wake-up signal (WUS). For example, the UE 115-b may be an example of an IoT device (e.g., an NB-IoT device) served by an NTN. Here, a PEI 335 may be an example of a WUS, and the UE 115-b may determine whether to monitor for the WUS in accordance with the area information 330-a (e.g., based on whether the virtual coverage area 315-a is included in or the same as virtual coverage area 315 indicated via the area information 330-a, based on whether the virtual coverage area 315-a is the current virtual coverage area 315 of the UE 115-b). The network entity 105-c may similarly determine whether to transmit the WUS to the UE 115-b in accordance with the area information 330-a. If the UE 115-b determines to monitor for the WUS, the UE 115-b may monitor for and receive the WUS. The WUS may indicate for the UE 115-b to wake-up during an upcoming ON duration, for example, of a discontinuous reception (DRX) cycle according to which the UE 115-b operates.

Figure 4:
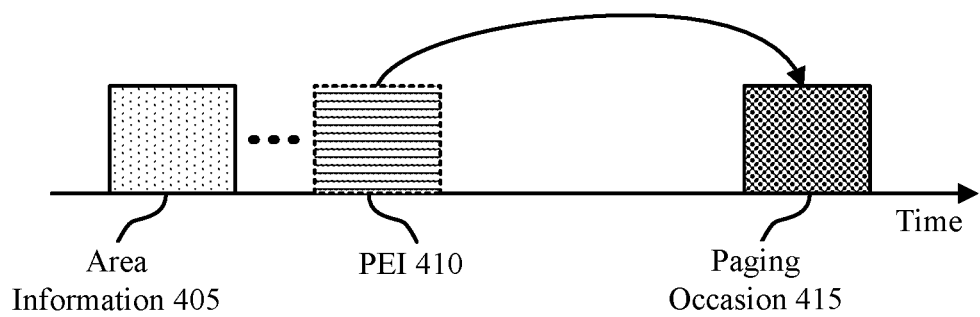
FIG. 4 illustrates an example of a communication diagram that supports paging message communication in an NTN in accordance with one or more aspects of the present disclosure.

FIG. 4 illustrates an example of a communication diagram 400 that supports paging message communication in an NTN in accordance with one or more aspects of the present disclosure. The communication diagram 400 may be implemented by aspects of the wireless communications systems 100 or 300 or network architecture 200. For example, the communication diagram 400 may be implemented by a UE 115 and a network entity 105 as described herein to support communicating and monitoring paging messages based on virtual coverage areas.

The communication diagram 400 depicts the communication of various paging messages. For example, the communication diagram 400 includes a PEI 410 and a paging occasion 415, which may be examples of a PEI 335 and a paging occasion 340 as described with reference to FIG. 3, respectively. The UE 115 and the network entity 105 may communicate the paging messages after the UE 115 camps on a cell served by the network entity 105 based on a virtual coverage area of the UE 115.

For example, prior to camping on the cell, the UE 115 may release a connection with another cell (e.g., or the same cell). The UE 115 may determine a first virtual coverage area that corresponds to a geographic location of the UE 115 at the time of the connection release. In response to the UE 115 camping on the cell, the network entity 105 may transmit area information 405 to the UE 115 (e.g., via a broadcast message, via a synchronization signal block (SSB), via a multicast message, via a system information message such as a system information block (SIB)), which may be an example of area information 330 described with reference to FIG. 3.

The UE 115 may determine whether to monitor for the PEI 410 in accordance with the first virtual coverage area and the area information 405. For example, if the first virtual coverage area is included in or the same as a virtual coverage area indicated by the area information 405, the UE 115 may monitor for the PEI 410. Additionally or alternatively, if the first virtual coverage area is the same as a current virtual coverage area of the UE 115, the UE 115 may monitor for the PEI 410. Otherwise, the UE 115 may refrain from monitoring for the PEI 410 and may instead monitor the paging occasion 415.

The PEI 410 may indicate one or more paging subgroups that are to monitor the paging occasion 415. For example, the UE 115 may be associated with (e.g., configured to be included in) a first paging subgroup of a set of paging subgroups. In some examples, the PEI 410 may indicate that UEs 115 corresponding to the first paging subgroup are to monitor the paging occasion 415 for control information (e.g., DCI), which may correspond to an upcoming paging occasion 415 (e.g., a next paging occasion 415, a paging occasion 415 subsequent to the PEI 410). In some examples, the PEI 410 may indicate that the UEs 115 corresponding to the first paging subgroup are to refrain from monitoring the paging occasion 415. In some examples, the PEI 410 may exclude an indication associated with the first paging subgroup, which may indicate for the UEs 115 corresponding to the first paging subgroup to refrain from monitoring the paging occasion 415.

The UE 115 may receive (e.g., detect) the PEI 410, for example, if it determines to monitor for the PEI 410 and may or may not monitor the paging occasion 415 in accordance with the PEI 410. For example, if the PEI 410 indicates for the UE 115 to monitor the paging occasion 415, the UE 115 may monitor the paging occasion 415 for control information. Otherwise, if the PEI 410 indicates for the UE 115 to refrain from monitoring the paging occasion 415 (e.g., or if the UE 115 fails to detect the PEI 410, or if the network entity 105 determines not to transmit the PEI 410), the UE 115 may refrain from monitoring the paging occasion 415, thereby reducing a power consumption of the UE 115 relative to if the UE 115 monitors the paging occasion 415.

Figure 5:
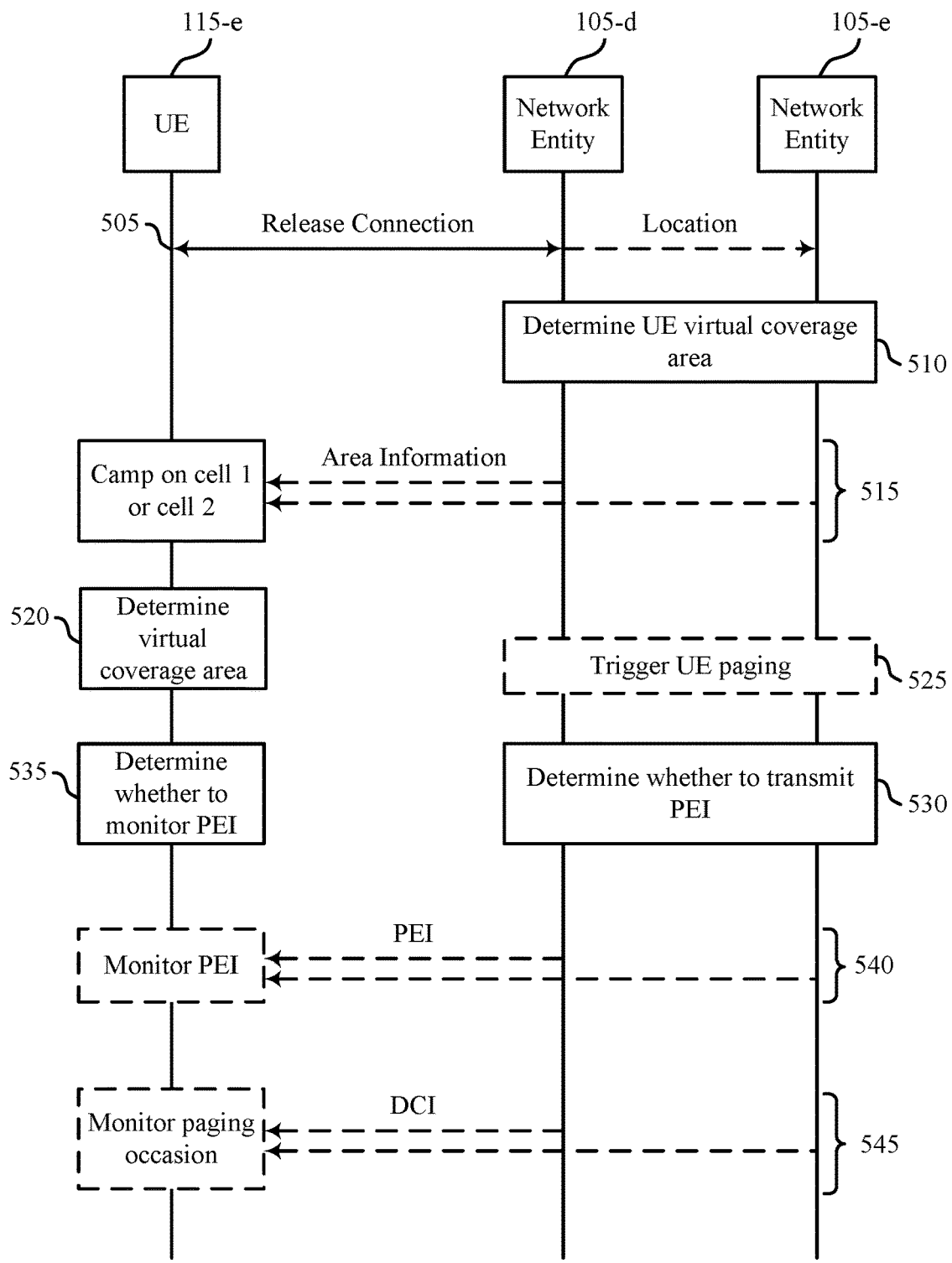
FIG. 5 illustrates an example of a process flow that supports paging message communication in an NTN in accordance with one or more aspects of the present disclosure.

FIG. 5 illustrates an example of a process flow 500 that supports paging message communication in an NTN in accordance with one or more aspects of the present disclosure. The process flow 500 may be implemented by aspects of the wireless communications systems 100 or 300 or network architecture 200. For example, the process flow 500 may illustrate communication between and operations performed by a UE 115-e, a network entity 105-d, and a network entity 105-e, which may be examples of corresponding devices described herein, including with reference to FIGS. 1 through 4.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the UE 115-e and the network entity 105-d may communicate a connection release message to release (e.g., suspend) a connection for the UE 115-e. For example, the network entity 105-d may be associated with (e.g., serve, provide coverage for) a first cell, and the first cell may release the connection with the UE 115-e. Based on the connection release, the UE 115-e may determine its geographic location (e.g., via a GNSS). That is, the UE 115-e as part of or in response to the connection release, the UE 115-e may determine (e.g., and store) its geographic location. Similarly, the network entity 105-d may determine the geographic location of the UE 115-e based on the connection release. In some examples, the network entity 105-d may transmit a control message to the network entity 105-e that indicates the determined geographic location of the UE 115-e and/or the virtual coverage area of the UE 115-e.

In some examples, before or as part of the connection release, the network entity 105-d may transmit a control message to the UE 115-e that indicates a function via which the UE 115-e may determine a first virtual coverage area corresponding to the determined geographic location of the UE 115-e.

At 510, the network entity 105-d or the network entity 105-e may determine the first virtual coverage area of the UE 115-e corresponding to the determined geographic location. For example, if the network entity 105-d and the network entity 105-e move such that the network entity 105-e serves a coverage area in which the UE 115-e is located, the network entity 105-e may determine the first virtual coverage area (e.g., based on indication of the determined geographic location of the UE 115-e). Alternatively, if the network entity 105-d serves the coverage area, the network entity 105-d may determine the coverage area. Alternatively, the network entity 105-d may determine the coverage area and transmit an indication of the first virtual coverage area to the network entity 105-e based on the movement of the network entities 105.

At 515, the UE 115-e may camp on the first cell served by the network entity 105-d or a second cell served by the network entity 105-e, for example, based on which network entity 105 serves the coverage area in which the UE 115-e is located. The UE 115-e may receive area information from a serving network entity 105 (e.g., the network entity 105-d if camped on the first cell, the network entity 105-e if camped on the second cell). The area information may be indicative of one or more second virtual coverage areas that the UE 115-e and the serving network entity 105 may use to determine whether to communicate a PEI.

For example, the area information may include an indication of the one or more second virtual coverage areas (e.g., one or more virtual coverage area indexes). Alternatively, the area information may include an indication monitor for the PEI based on a current virtual coverage area of the UE 115-e (e.g., a last-used-virtual-coverage-area-only indication). In some examples, the area information may include an indication of the function via which the UE 115-e may determine the first virtual coverage area. In some examples, the area information may be included in a broadcast message or a multicast message.

At 520, the UE 115-e may determine the first virtual coverage area corresponding to the geographic location of the UE 115-e determined in association with the connection release. For example, the UE 115-e may use the function to map the geographic location of the UE 115-e to the first virtual coverage area.

At 525, the serving network entity 105 may trigger a UE paging procedure to transmit a paging message, such as a PEI or DCI in a paging occasion, to trigger an RRC setup between the UE 115-e and the serving network entity 105.

At 530, the serving network entity 105 may determine whether to transmit a PEI based on the area information. For example, if the first virtual coverage area is included in or the same as one of the indicated second virtual coverage areas, the serving network entity 105 may determine to transmit the PEI. If the first virtual coverage area is excluded from the indicated second virtual coverage areas, the serving network entity 105 may determine to refrain from transmitting the PEI. Alternatively, if the area information included the indication to monitor for the PEI based on the current virtual coverage area of the UE 115-e, the serving network entity 105 may assume that the current virtual coverage area of the UE 115-e is the same as the first virtual coverage area of the UE 115-e and determine to transmit the PEI.

At 535, the UE 115-e may determine whether to monitor for the PEI in accordance with the area information. For example, if the first virtual coverage area is included in or the same as one of the indicated virtual coverage areas or if the current virtual coverage area (e.g., determined based on a current geographic location of the UE 115-e) is the same as the first virtual coverage area, the UE 115-e may determine to monitor for the PEI. If the first virtual coverage area is excluded from or different than the indicated virtual coverage areas or if the current virtual coverage area of the UE 115-e is different than the first virtual coverage area, the UE 115-e may determine to refrain from monitoring the PEI and instead may determine to monitor an upcoming paging occasion.

In some examples, the UE 115-e may not receive area information from a serving network entity 105 (e.g., the network entity 105-d if camped on the first cell, the network entity 105-e if camped on the second cell). Here the UE 115-e may assume to monitor for the PEI based on a current virtual coverage area of the UE 115-e. That is, if the UE 115-e does not receive the area information, the UE 115-e may be configured to monitor for the PEI as if the UE 115-e received area information that includes an indication to monitor for the PEI based on the current virtual coverage area of the UE 115-e.

At 540, the UE 115-e and the serving network entity 105 may communicate the PEI in accordance with the monitoring determination. For example, the UE 115-e may monitor for the PEI and the serving network entity 105 may transmit the PEI in accordance with the determinations at 535 and 530, respectively. Alternatively, the UE 115-e may refrain from monitoring for the PEI and the serving network entity 105 may refrain from transmitting the PEI in accordance with the determinations at 535 and 530, respectively. If the PEI is transmitted, the PEI may indicate for the UE 115-e to monitor the upcoming paging occasion for DCI.

At 545, the UE 115-e and the serving network entity 105 may communicate DCI. For example, if the UE 115-e refrains from monitoring for the PEI or receives the PEI that indicates for the UE 115-e to monitor the upcoming paging occasion, the UE 115-e may monitor the paging occasion for the DCI. If the serving network entity 105 transmits the PEI, the serving network entity 105 may transmit the DCI during the paging occasion. If the serving network entity 105 refrains from transmitting the PEI, the serving network entity 105 may or may not transmit the DCI during the paging occasion.

Figure 6:
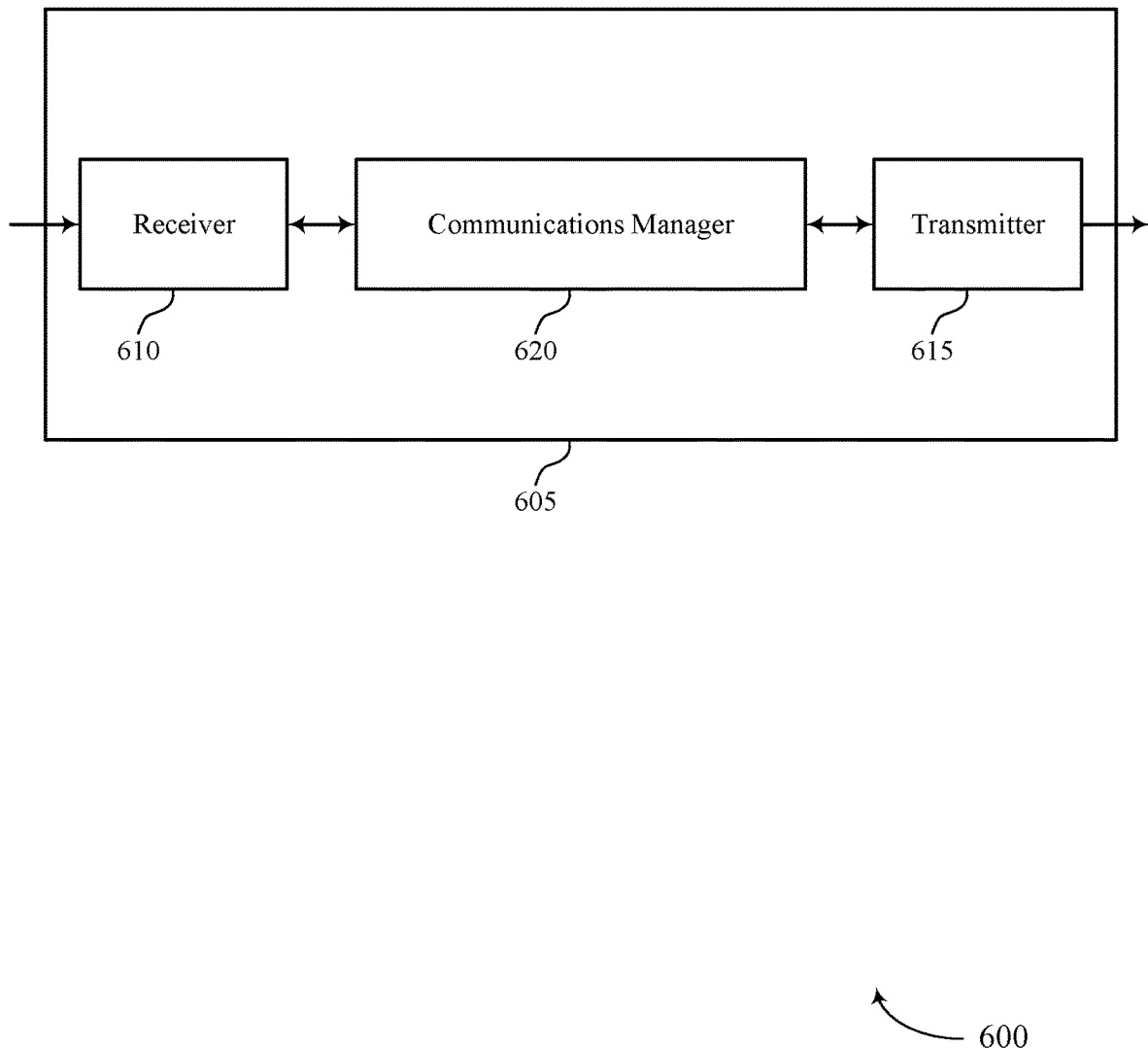
FIGS. 6 and 7 show block diagrams of devices that support paging message communication in an NTN in accordance with one or more aspects of the present disclosure.

FIG. 6 shows a block diagram 600 of a device 605 that supports paging message communication in an NTN in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to paging message communication in an NTN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to paging message communication in an NTN). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of paging message communication in an NTN as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for communicating a connection release message to release a first connection for the UE, where a geographic location of the UE associated with the release of the first connection corresponds to a first virtual coverage area associated with a geographic coverage area. The communications manager 620 may be configured as or otherwise support a means for obtaining a message including area information indicative of one or more second virtual coverage areas that is associated with a PEI for one or more paging occasions associated with the one or more second virtual coverage areas. The communications manager 620 may be configured as or otherwise support a means for monitoring for a paging message based on the first virtual coverage area of the UE and the one or more second virtual coverage areas.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
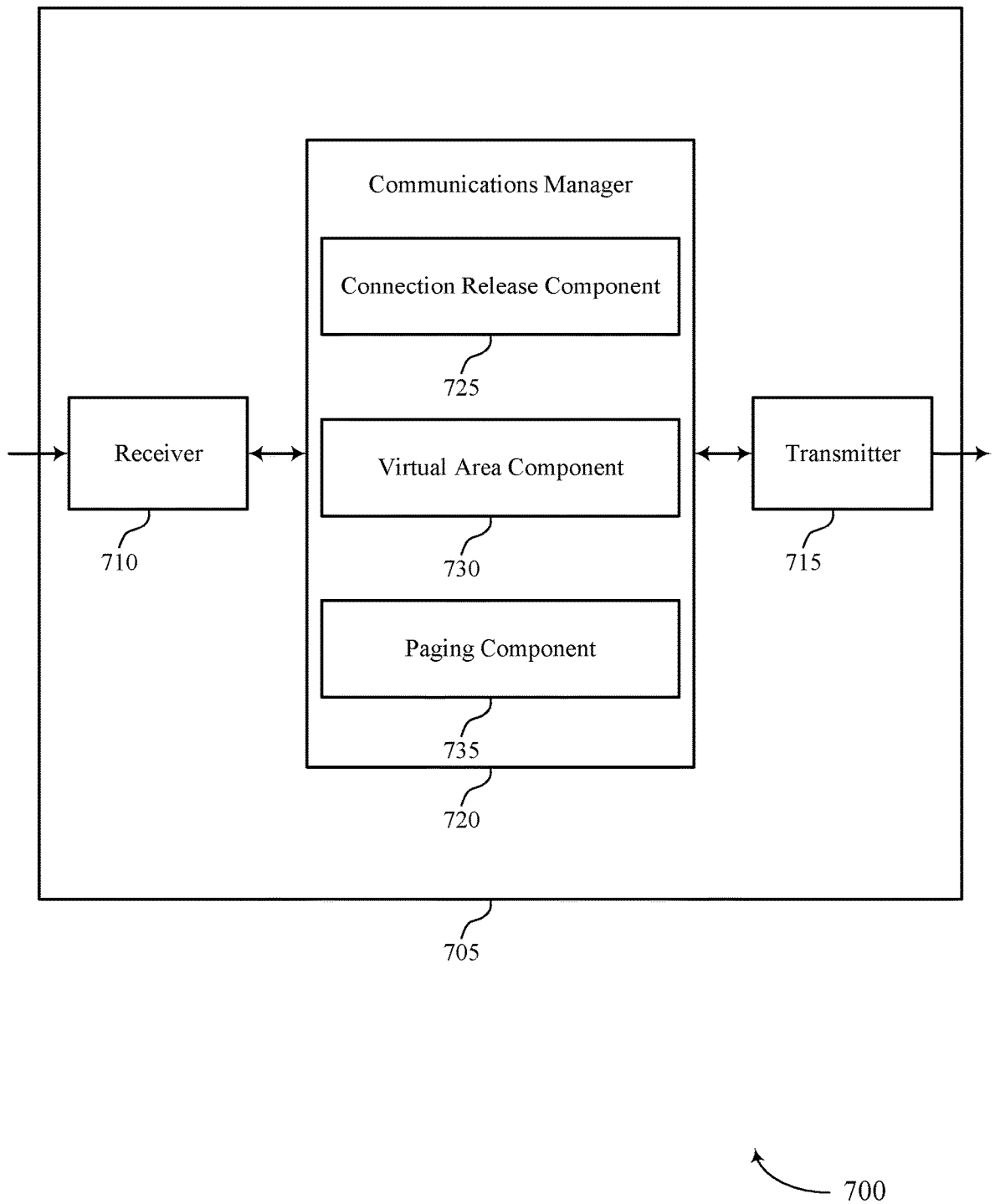

FIG. 7 shows a block diagram 700 of a device 705 that supports paging message communication in an NTN in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to paging message communication in an NTN). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to paging message communication in an NTN). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of paging message communication in an NTN as described herein. For example, the communications manager 720 may include a connection release component 725, a virtual area component 730, a paging component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The connection release component 725 may be configured as or otherwise support a means for communicating a connection release message to release a first connection for the UE, where a geographic location of the UE associated with the release of the first connection corresponds to a first virtual coverage area associated with a geographic coverage area. The virtual area component 730 may be configured as or otherwise support a means for obtaining a message including area information indicative of one or more second virtual coverage areas that is associated with a PEI for one or more paging occasions associated with the one or more second virtual coverage areas. The paging component 735 may be configured as or otherwise support a means for monitoring for a paging message based on the first virtual coverage area of the UE and the one or more second virtual coverage areas.

Figure 8:
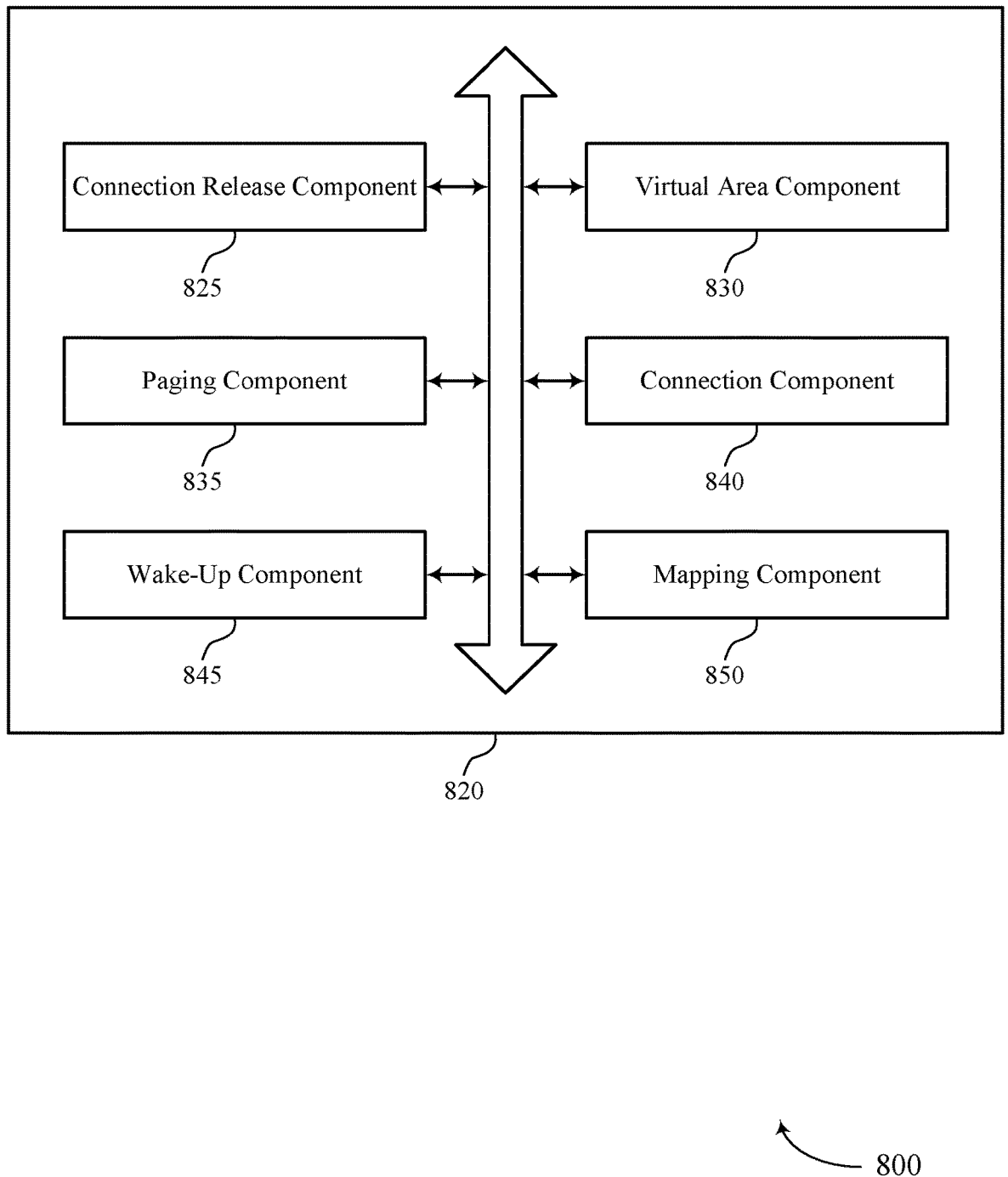
FIG. 8 shows a block diagram of a communications manager that supports paging message communication in an NTN in accordance with one or more aspects of the present disclosure.

FIG. 8 shows a block diagram 800 of a communications manager 820 that supports paging message communication in an NTN in accordance with one or more aspects of the present disclosure. The communications manager 820 may be an example of aspects of a communications manager 620, a communications manager 720, or both, as described herein. The communications manager 820, or various components thereof, may be an example of means for performing various aspects of paging message communication in an NTN as described herein. For example, the communications manager 820 may include a connection release component 825, a virtual area component 830, a paging component 835, a connection component 840, a wake-up component 845, a mapping component 850, or any combination thereof. Each of these components may communicate, directly or indirectly, with one another (e.g., via one or more buses).

The communications manager 820 may support wireless communication at a UE in accordance with examples as disclosed herein. The connection release component 825 may be configured as or otherwise support a means for communicating a connection release message to release a first connection for the UE, where a geographic location of the UE associated with the release of the first connection corresponds to a first virtual coverage area associated with a geographic coverage area. The virtual area component 830 may be configured as or otherwise support a means for obtaining a message including area information indicative of one or more second virtual coverage areas that is associated with a PEI for one or more paging occasions associated with the one or more second virtual coverage areas. The paging component 835 may be configured as or otherwise support a means for monitoring for a paging message based on the first virtual coverage area of the UE and the one or more second virtual coverage areas.

In some examples, the area information includes an indication of the one or more second virtual coverage areas. In some examples, to support monitoring for the paging message, the paging component 835 may be configured as or otherwise support a means for monitoring for the PEI based on the first virtual coverage area being included in the one or more second virtual coverage areas.

In some examples, the area information includes an indication of the one or more second virtual coverage areas. In some examples, to support monitoring for the paging message, the paging component 835 may be configured as or otherwise support a means for monitoring for DCI associated with a paging occasion based on the first virtual coverage area being excluded from the one or more second virtual coverage areas.

In some examples, the area information includes an indication to monitor for the PEI based on a current virtual coverage area of the UE. In some examples, to support monitoring for the paging message, the paging component 835 may be configured as or otherwise support a means for monitoring for the PEI based on the first virtual coverage area being the same as the one or more second virtual coverage areas, the one or more second virtual coverage areas corresponding to a current geographic location of the UE.

In some examples, the area information includes an indication to monitor for the PEI based on a current virtual coverage area of the UE. In some examples, to support monitoring for the paging message, the paging component 835 may be configured as or otherwise support a means for monitoring for DCI associated with a paging occasion based on the first virtual coverage area being different than the one or more second virtual coverage areas, the one or more second virtual coverage areas corresponding to a current geographic location of the UE.

In some examples, the area information includes a last-used-virtual-coverage-area-only indication associated with the PEI. In some examples, to support monitoring for the paging message, the paging component 835 may be configured as or otherwise support a means for monitoring for the PEI or DCI associated with a paging occasion based on the last-used-virtual-coverage-area-only indication and whether the first virtual coverage area is the same as the one or more second virtual coverage areas, the one or more second virtual coverage areas corresponding to a current geographic location of the UE.

In some examples, to support monitoring for the paging message, the paging component 835 may be configured as or otherwise support a means for monitoring for the PEI or DCI associated with a paging occasion based on whether a first index of the first virtual coverage area corresponds to a second index associated with the one or more second virtual coverage areas.

In some examples, at least one of the first virtual coverage area of the UE and the one or more second virtual coverage areas are determined using a function that maps geographic locations to a respective virtual coverage area.

In some examples, the mapping component 850 may be configured as or otherwise support a means for obtaining a control message that indicates the function that maps geographic locations to the respective virtual coverage area.

In some examples, the connection component 840 may be configured as or otherwise support a means for establishing a second connection for the UE, where the area information is obtained based on the establishment of the second connection.

In some examples, the first virtual coverage area is a first virtual cell or a first virtual beam. In some examples, the one or more second virtual coverage areas are one or more second virtual cells or one or more second virtual beams.

In some examples, to support monitoring for the paging message, the wake-up component 845 may be configured as or otherwise support a means for monitoring for a WUS based on the first virtual coverage area being included in the one or more second virtual coverage areas.

In some examples, the message including the area information is a broadcast message. In some examples, the message including the area information is a multicast message.

Figure 9:
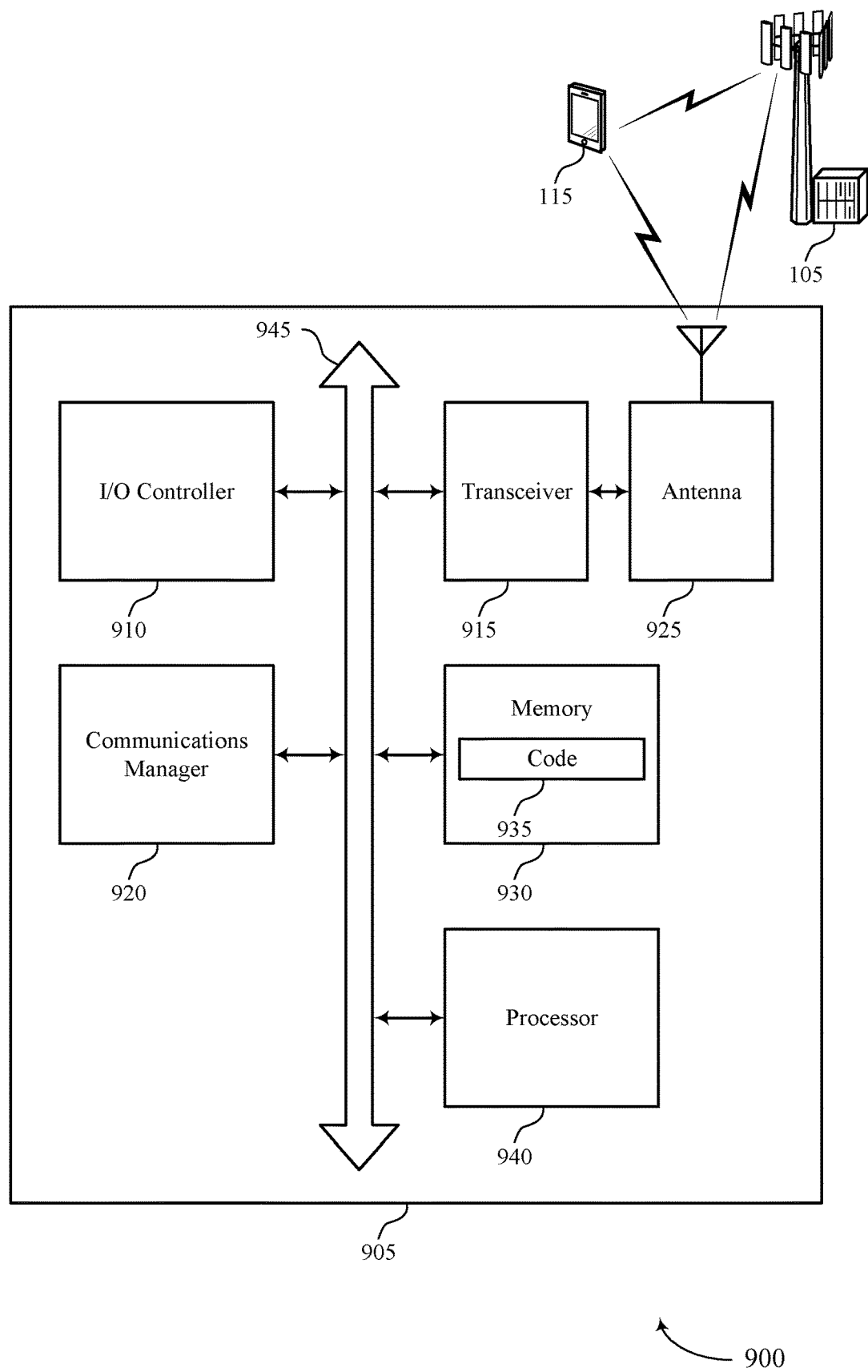
FIG. 9 shows a diagram of a system including a device that supports paging message communication in an NTN in accordance with one or more aspects of the present disclosure.

FIG. 9 shows a diagram of a system 900 including a device 905 that supports paging message communication in an NTN in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting paging message communication in an NTN). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for communicating a connection release message to release a first connection for the UE, where a geographic location of the UE associated with the release of the first connection corresponds to a first virtual coverage area associated with a geographic coverage area. The communications manager 920 may be configured as or otherwise support a means for obtaining a message including area information indicative of one or more second virtual coverage areas that is associated with a PEI for one or more paging occasions associated with the one or more second virtual coverage areas. The communications manager 920 may be configured as or otherwise support a means for monitoring for a paging message based on the first virtual coverage area of the UE and the one or more second virtual coverage areas.

By including or configuring the communications manager 920 in accordance with examples as described herein, the device 905 may support techniques for reduced processing, reduced power consumption, more efficient utilization of communication resources, increased coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of paging message communication in an NTN as described herein, or the processor 940 and the memory 930 may be otherwise configured to perform or support such operations.

Figure 10:
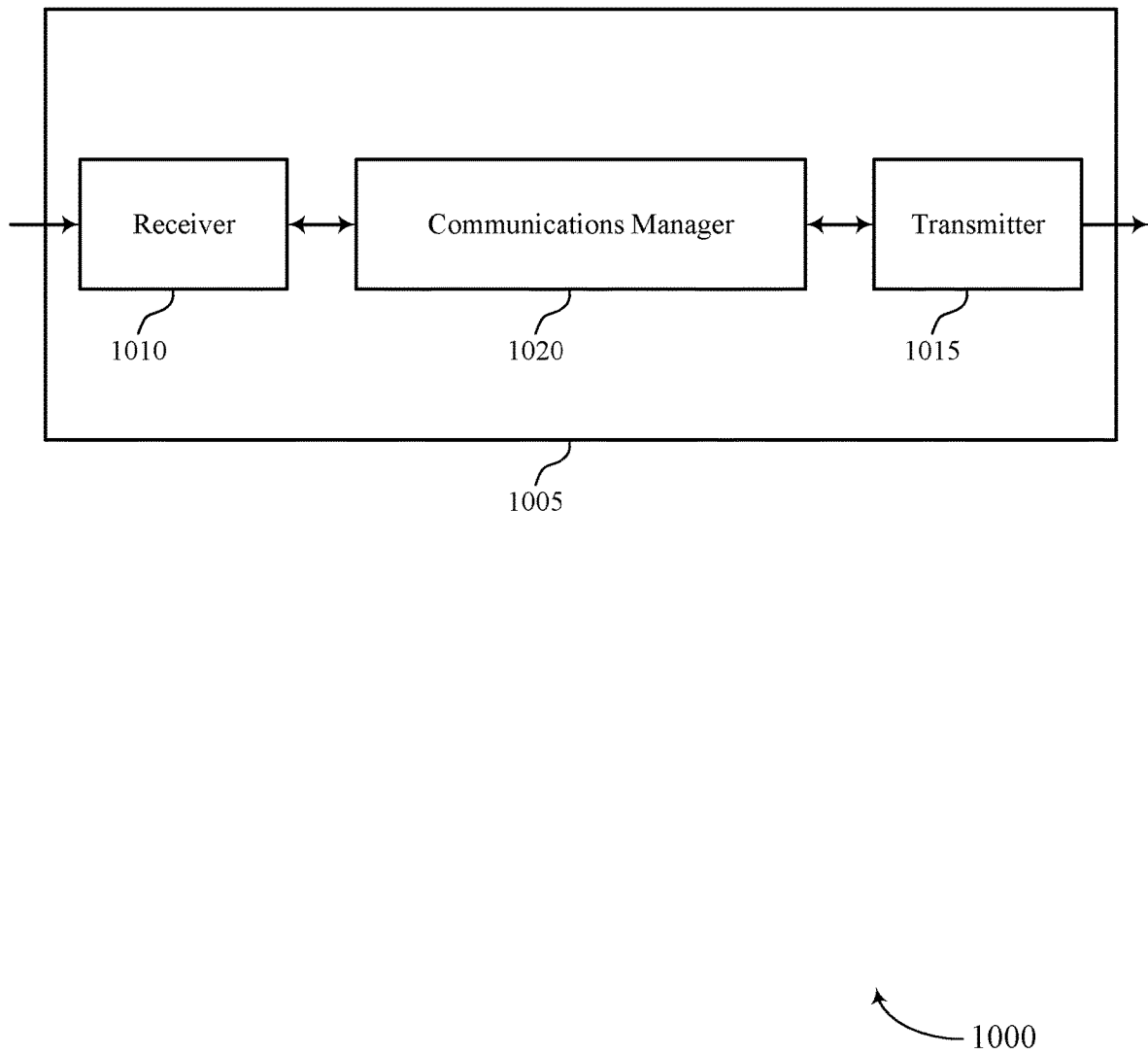
FIGS. 10 and 11 show block diagrams of devices that support paging message communication in an NTN in accordance with one or more aspects of the present disclosure.

FIG. 10 shows a block diagram 1000 of a device 1005 that supports paging message communication in an NTN in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of paging message communication in an NTN as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for communicating a connection release message to release a first connection for communication between the network entity and a first UE, where a first virtual coverage area associated with the release of the first connection corresponds to a geographic coverage area. The communications manager 1020 may be configured as or otherwise support a means for outputting a message including area information indicative of one or more second virtual coverage areas that is associated with a PEI. The communications manager 1020 may be configured as or otherwise support a means for outputting a paging message to one or more UEs based on respective virtual coverage areas of the one or more UEs and the one or more second virtual coverage areas.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
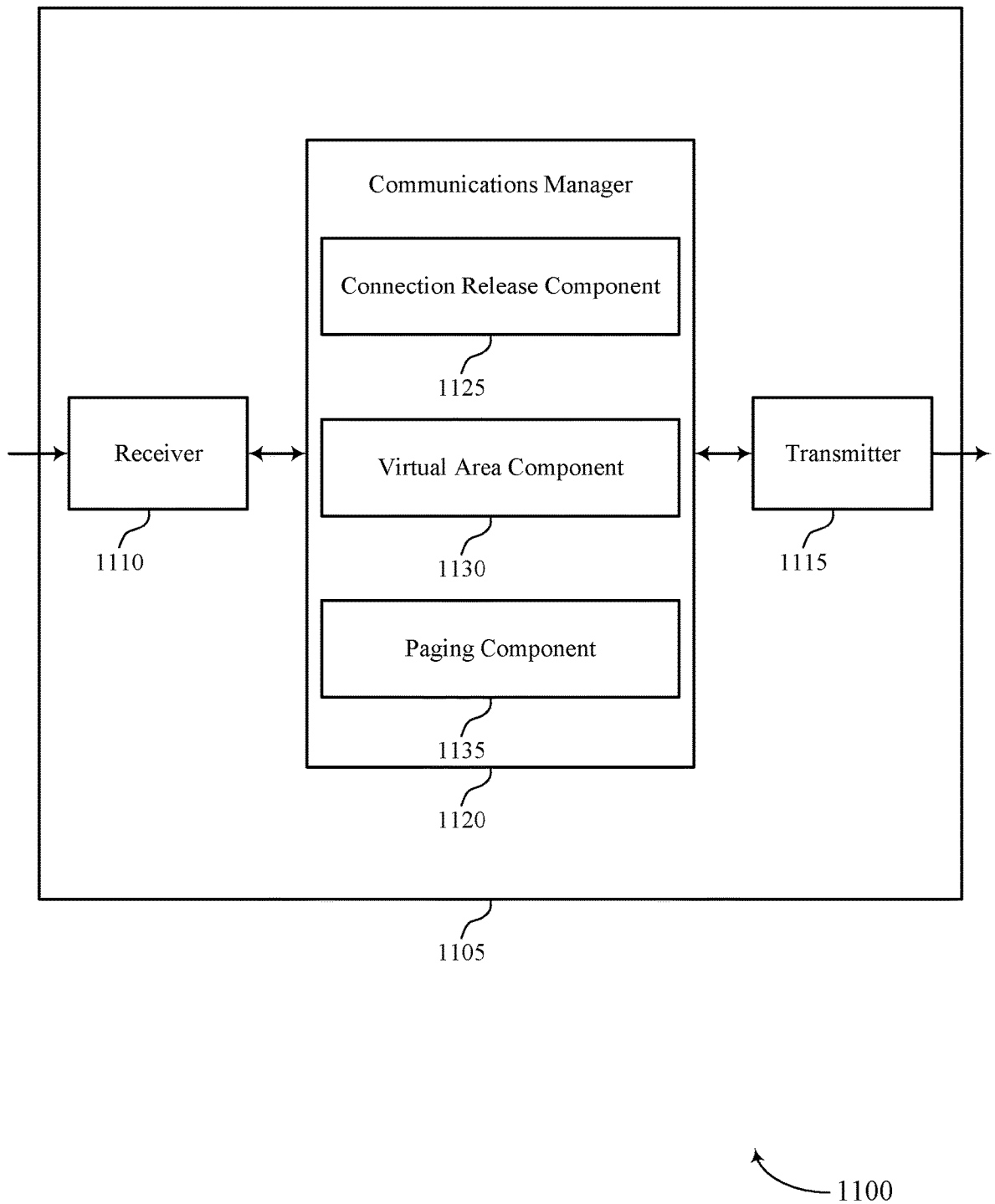

FIG. 11 shows a block diagram 1100 of a device 1105 that supports paging message communication in an NTN in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of paging message communication in an NTN as described herein. For example, the communications manager 1120 may include a connection release component 1125, a virtual area component 1130, a paging component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The connection release component 1125 may be configured as or otherwise support a means for communicating a connection release message to release a first connection for communication between the network entity and a first UE, where a first virtual coverage area associated with the release of the first connection corresponds to a geographic coverage area. The virtual area component 1130 may be configured as or otherwise support a means for outputting a message including area information indicative of one or more second virtual coverage areas that is associated with a PEI. The paging component 1135 may be configured as or otherwise support a means for outputting a paging message to one or more UEs based on respective virtual coverage areas of the one or more UEs and the one or more second virtual coverage areas.

Figure 12:
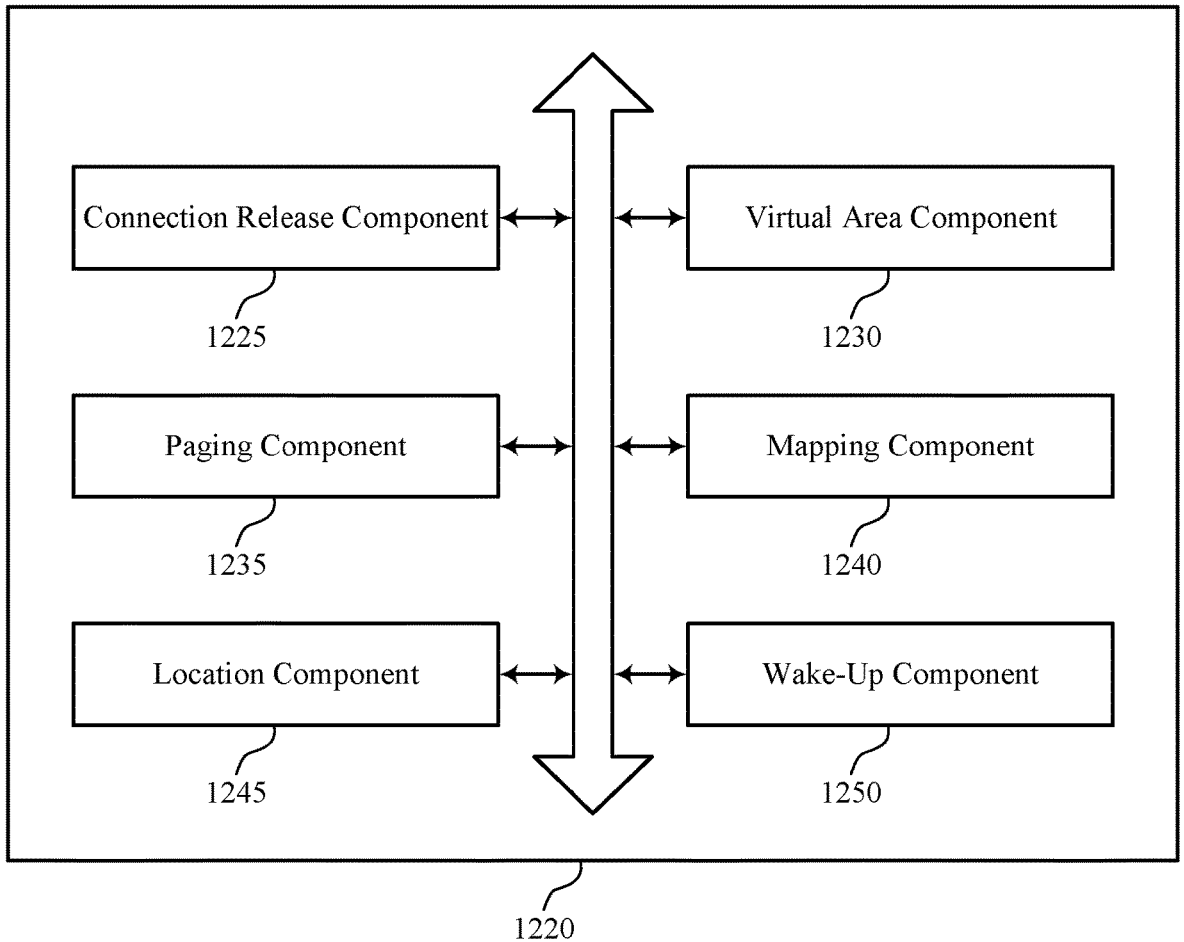
FIG. 12 shows a block diagram of a communications manager that supports paging message communication in an NTN in accordance with one or more aspects of the present disclosure.

FIG. 12 shows a block diagram 1200 of a communications manager 1220 that supports paging message communication in an NTN in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of paging message communication in an NTN as described herein. For example, the communications manager 1220 may include a connection release component 1225, a virtual area component 1230, a paging component 1235, a mapping component 1240, a location component 1245, a wake-up component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The connection release component 1225 may be configured as or otherwise support a means for communicating a connection release message to release a first connection for communication between the network entity and a first UE, where a first virtual coverage area associated with the release of the first connection corresponds to a geographic coverage area. The virtual area component 1230 may be configured as or otherwise support a means for outputting a message including area information indicative of one or more second virtual coverage areas that is associated with a PEI. The paging component 1235 may be configured as or otherwise support a means for outputting a paging message to one or more UEs based on respective virtual coverage areas of the one or more UEs and the one or more second virtual coverage areas.

In some examples, the area information includes an indication of the one or more second virtual coverage areas. In some examples, to support outputting the paging message, the paging component 1235 may be configured as or otherwise support a means for outputting the PEI to the one or more UEs based on the respective virtual coverage areas being included in the one or more second virtual coverage areas, where the one or more UEs include the first UE or exclude the first UE based on whether the first virtual coverage area is the same as the one or more second virtual coverage areas.

In some examples, the area information includes an indication of the one or more second virtual coverage areas. In some examples, to support outputting the paging message, the paging component 1235 may be configured as or otherwise support a means for outputting DCI associated with a paging occasion to the one or more UEs based on the respective virtual coverage areas being excluded from the one or more second virtual coverage areas.

In some examples, the area information includes an indication to monitor for the PEI based on a current virtual coverage area of the UE. In some examples, to support outputting the paging message, the paging component 1235 may be configured as or otherwise support a means for outputting the PEI based on the respective virtual coverage areas being the same as the one or more second virtual coverage areas.

In some examples, the area information includes an indication to monitor for the PEI based on a current virtual coverage area of the UE. In some examples, to support outputting the paging message, the paging component 1235 may be configured as or otherwise support a means for outputting DCI associated with a paging occasion based on the respective virtual coverage areas being different than the one or more second virtual coverage areas.

In some examples, the area information includes a last-used-virtual-coverage-area-only indication associated with the PEI. In some examples, to support outputting the paging message, the paging component 1235 may be configured as or otherwise support a means for outputting the PEI or DCI associated with a paging occasion based on the last-used-virtual-coverage-area-only indication and whether the respective virtual coverage areas are the same as the one or more second virtual coverage areas.

In some examples, to support outputting the paging message, the paging component 1235 may be configured as or otherwise support a means for outputting the PEI or DCI associated with a paging occasion based on whether a first index of the respective virtual coverage areas corresponds to a second index associated with the one or more second virtual coverage areas.

In some examples, at least one of the respective virtual coverage areas of the one or more UEs and the one or more second virtual coverage areas are determined using a function that maps geographic locations to virtual coverage areas.

In some examples, the mapping component 1240 may be configured as or otherwise support a means for outputting, to the first UE, the one or more UEs, or both, a control message that indicates a function that maps geographic locations to virtual coverage areas.

In some examples, the location component 1245 may be configured as or otherwise support a means for outputting an indication of a geographic location of the first UE to a second network entity.

In some examples, to support outputting the paging message, the wake-up component 1250 may be configured as or otherwise support a means for outputting a WUS based on the respective virtual coverage areas being included in the one or more second virtual coverage areas.

In some examples, the respective virtual coverage areas are virtual cells or virtual beams. In some examples, the one or more second virtual coverage areas are one or more second virtual cells or one or more second virtual beams.

In some examples, the message including the area information is a broadcast message. In some examples, the message including the area information is a multicast message.

Figure 13:
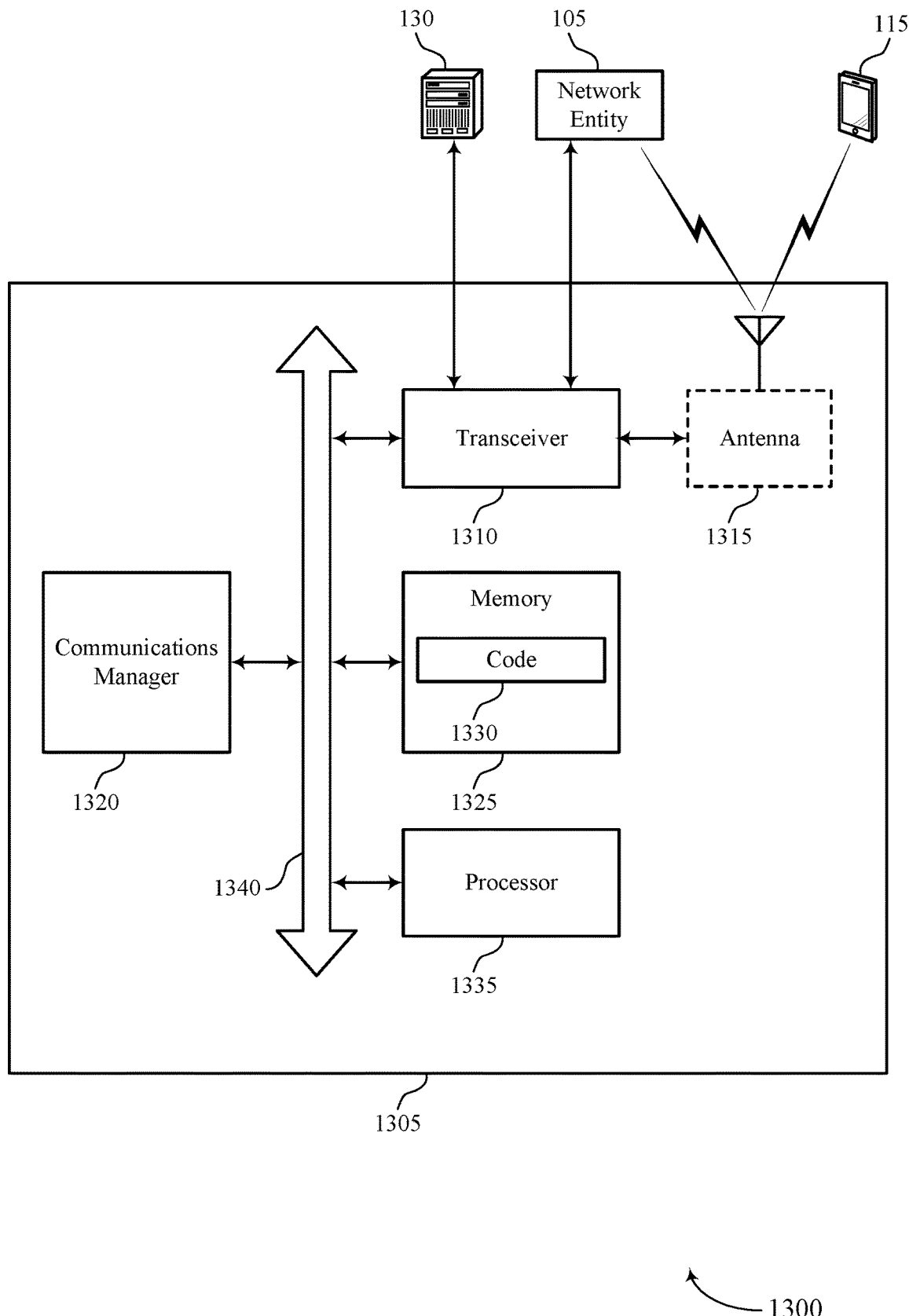
FIG. 13 shows a diagram of a system including a device that supports paging message communication in an NTN in accordance with one or more aspects of the present disclosure.

FIG. 13 shows a diagram of a system 1300 including a device 1305 that supports paging message communication in an NTN in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting paging message communication in an NTN). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for communicating a connection release message to release a first connection for communication between the network entity and a first UE, where a first virtual coverage area associated with the release of the first connection corresponds to a geographic coverage area. The communications manager 1320 may be configured as or otherwise support a means for outputting a message including area information indicative of one or more second virtual coverage areas that is associated with a PEI. The communications manager 1320 may be configured as or otherwise support a means for outputting a paging message to one or more UEs based on respective virtual coverage areas of the one or more UEs and the one or more second virtual coverage areas.

By including or configuring the communications manager 1320 in accordance with examples as described herein, the device 1305 may support techniques for reduced processing, reduced power consumption, more efficient utilization of communication resources, increased coordination between devices, and longer battery life.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of paging message communication in an NTN as described herein, or the processor 1335 and the memory 1325 may be otherwise configured to perform or support such operations.

Figure 14:
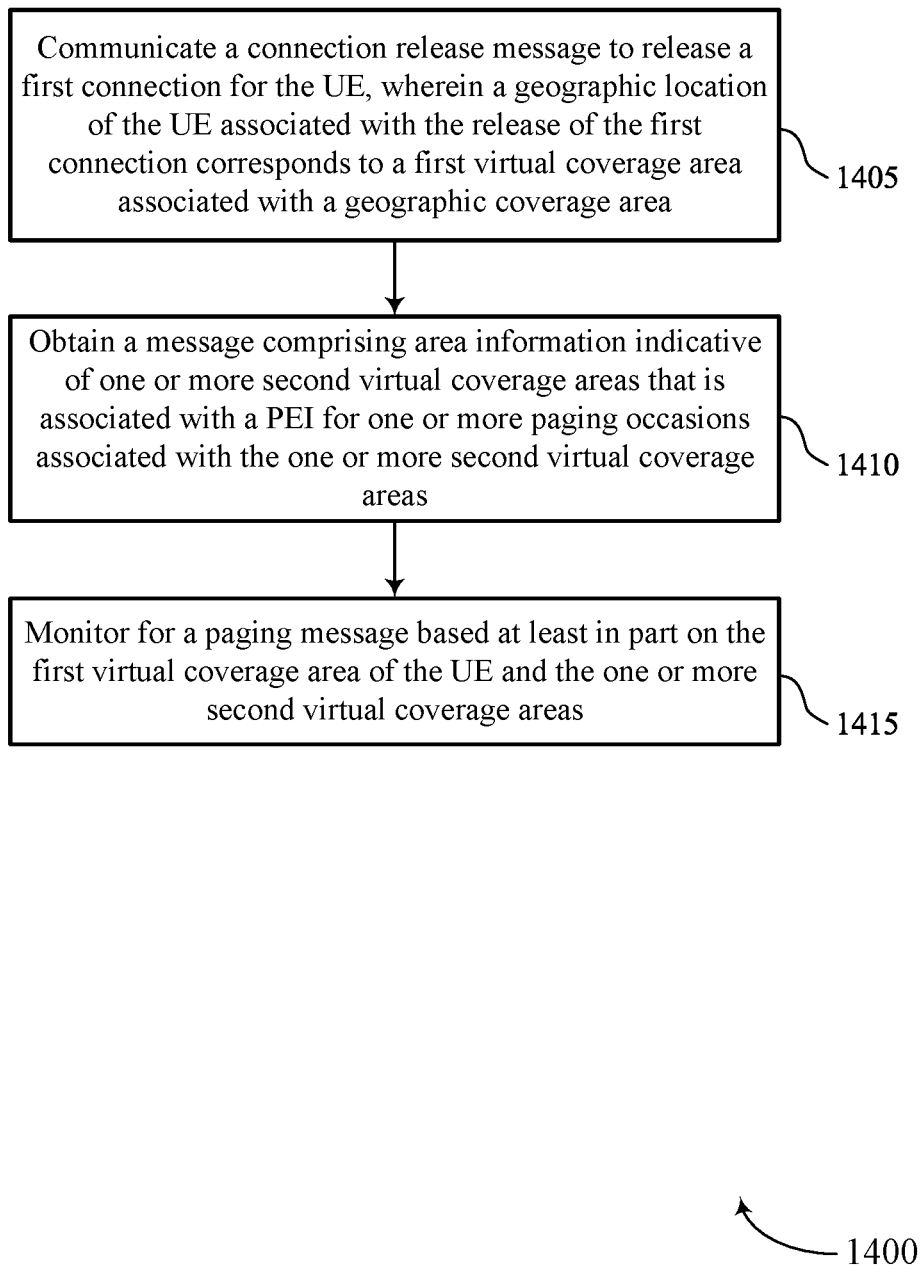
FIGS. 14 through 19 show flowcharts illustrating methods that support paging message communication in an NTN in accordance with one or more aspects of the present disclosure.

FIG. 14 shows a flowchart illustrating a method 1400 that supports paging message communication in an NTN in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include communicating a connection release message to release a first connection for the UE, where a geographic location of the UE associated with the release of the first connection corresponds to a first virtual coverage area associated with a geographic coverage area. The operations of 1405 may be performed in accordance with examples as disclosed herein. In some examples, aspects of the operations of 1405 may be performed by a connection release component 825 as described with reference to FIG. 8.

At 1410, the method may include obtaining a message including area information indicative of one or more second virtual coverage areas that is associated with a PEI for one or more paging occasions associated with the one or more second virtual coverage areas. The operations of 1410 may be performed in accordance with examples as disclosed herein. In some examples, aspects of the operations of 1410 may be performed by a virtual area component 830 as described with reference to FIG. 8.

At 1415, the method may include monitoring for a paging message based on the first virtual coverage area of the UE and the one or more second virtual coverage areas. The operations of 1415 may be performed in accordance with examples as disclosed herein. In some examples, aspects of the operations of 1415 may be performed by a paging component 835 as described with reference to FIG. 8.

Figure 15:
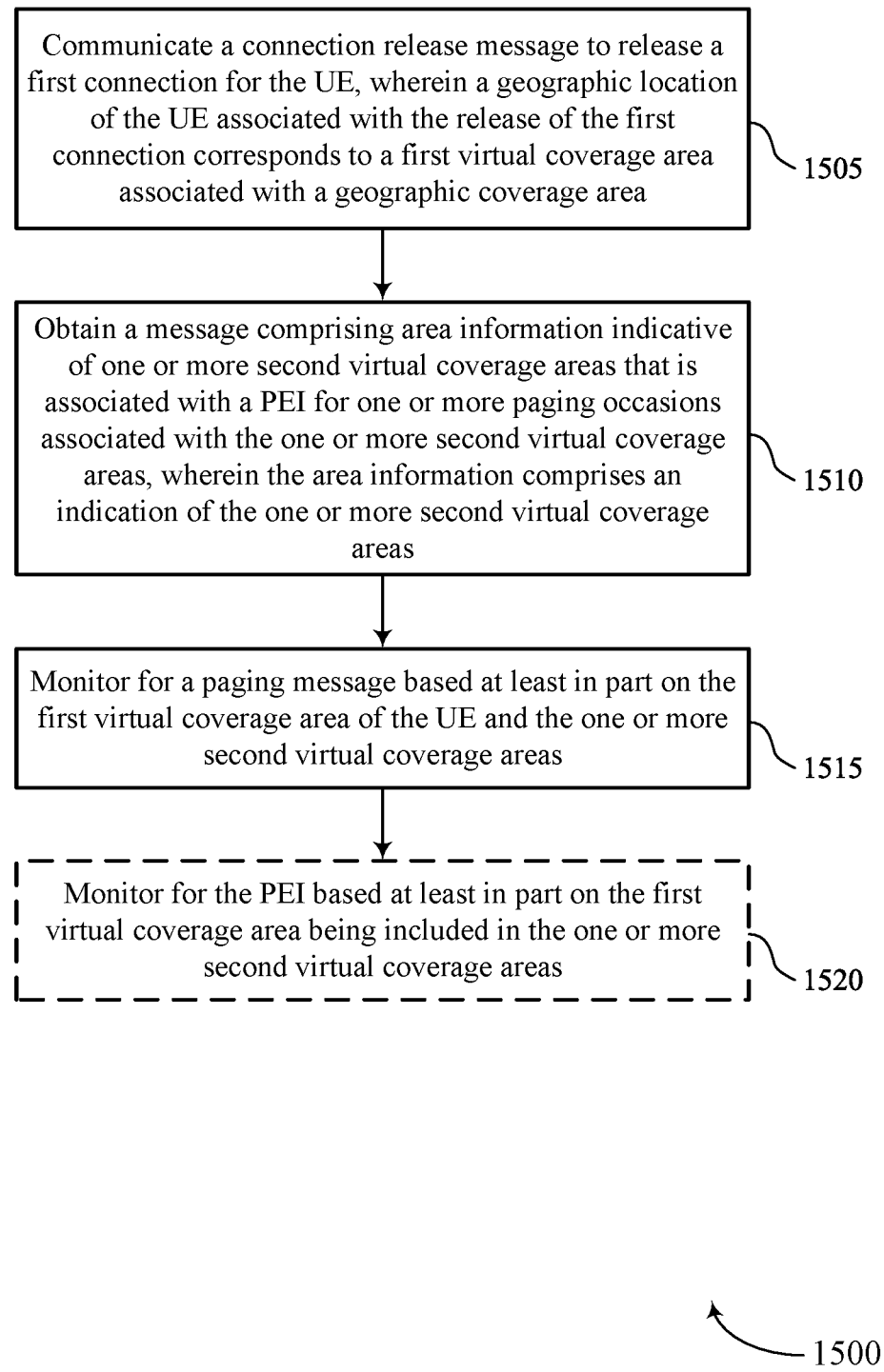

FIG. 15 shows a flowchart illustrating a method 1500 that supports paging message communication in an NTN in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include communicating a connection release message to release a first connection for the UE, where a geographic location of the UE associated with the release of the first connection corresponds to a first virtual coverage area associated with a geographic coverage area. The operations of 1505 may be performed in accordance with examples as disclosed herein. In some examples, aspects of the operations of 1505 may be performed by a connection release component 825 as described with reference to FIG. 8.

At 1510, the method may include obtaining a message including area information indicative of one or more second virtual coverage areas that is associated with a PEI for one or more paging occasions associated with the one or more second virtual coverage areas, where the area information includes an indication of the one or more second virtual coverage areas. The operations of 1510 may be performed in accordance with examples as disclosed herein. In some examples, aspects of the operations of 1510 may be performed by a virtual area component 830 as described with reference to FIG. 8.

At 1515, the method may include monitoring for a paging message based on the first virtual coverage area of the UE and the one or more second virtual coverage areas. The operations of 1515 may be performed in accordance with examples as disclosed herein. In some examples, aspects of the operations of 1515 may be performed by a paging component 835 as described with reference to FIG. 8.

At 1520, to support monitoring for the paging message, the method may include monitoring for the PEI based on the first virtual coverage area being included in the one or more second virtual coverage areas. The operations of 1520 may be performed in accordance with examples as disclosed herein. In some examples, aspects of the operations of 1520 may be performed by a paging component 835 as described with reference to FIG. 8.

Figure 16:
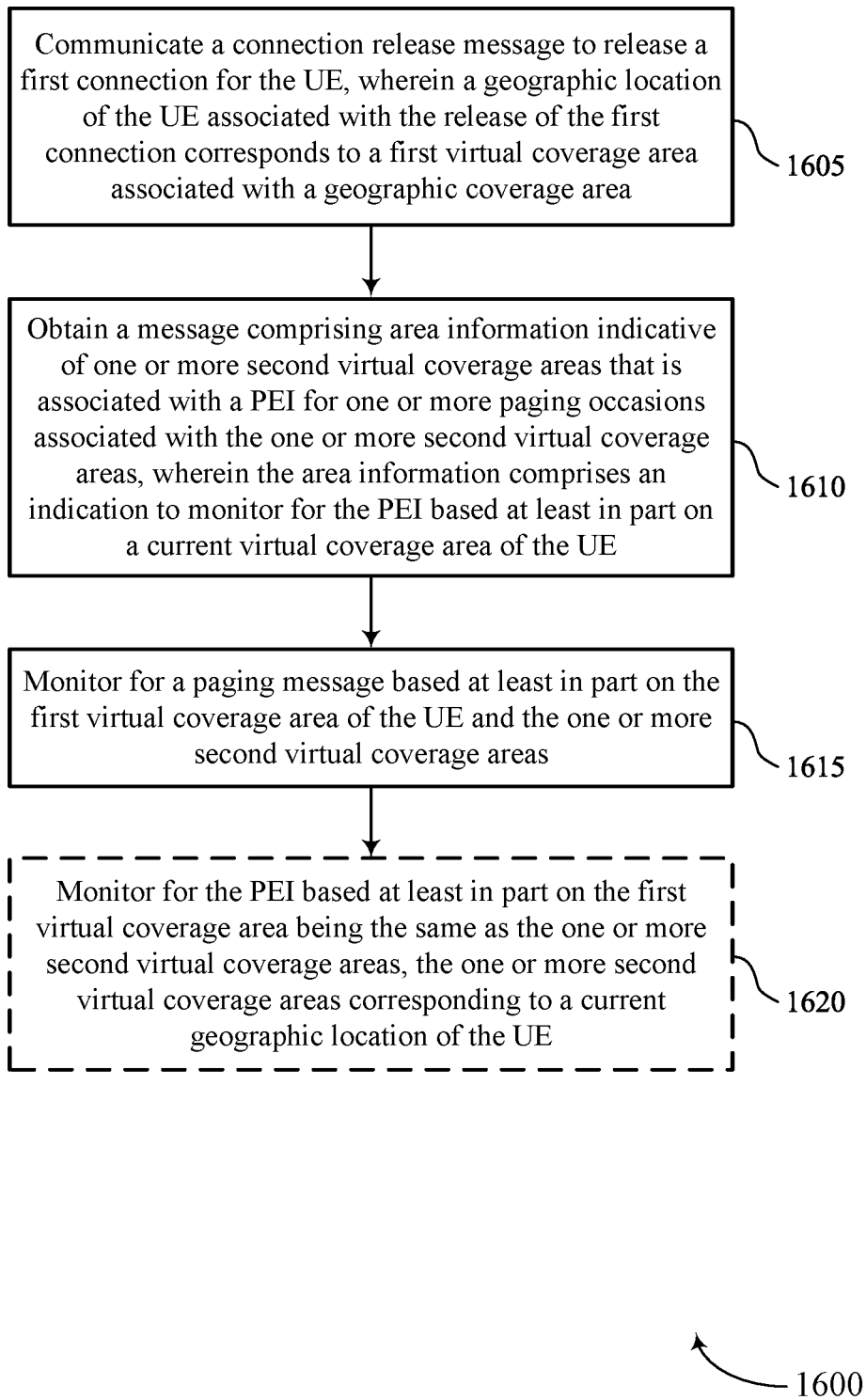

FIG. 16 shows a flowchart illustrating a method 1600 that supports paging message communication in an NTN in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include communicating a connection release message to release a first connection for the UE, where a geographic location of the UE associated with the release of the first connection corresponds to a first virtual coverage area associated with a geographic coverage area. The operations of 1605 may be performed in accordance with examples as disclosed herein. In some examples, aspects of the operations of 1605 may be performed by a connection release component 825 as described with reference to FIG. 8.

At 1610, the method may include obtaining a message including area information indicative of one or more second virtual coverage areas that is associated with a PEI for one or more paging occasions associated with the one or more second virtual coverage areas, where the area information includes an indication to monitor for the PEI based on a current virtual coverage area of the UE. The operations of 1610 may be performed in accordance with examples as disclosed herein. In some examples, aspects of the operations of 1610 may be performed by a virtual area component 830 as described with reference to FIG. 8.

At 1615, the method may include monitoring for a paging message based on the first virtual coverage area of the UE and the one or more second virtual coverage areas. The operations of 1615 may be performed in accordance with examples as disclosed herein. In some examples, aspects of the operations of 1615 may be performed by a paging component 835 as described with reference to FIG. 8.

At 1620, to support monitoring for the paging message, the method may include monitoring for the PEI based on the first virtual coverage area being the same as the one or more second virtual coverage areas, the one or more second virtual coverage areas corresponding to a current geographic location of the UE. The operations of 1620 may be performed in accordance with examples as disclosed herein. In some examples, aspects of the operations of 1620 may be performed by a paging component 835 as described with reference to FIG. 8.

Figure 17:
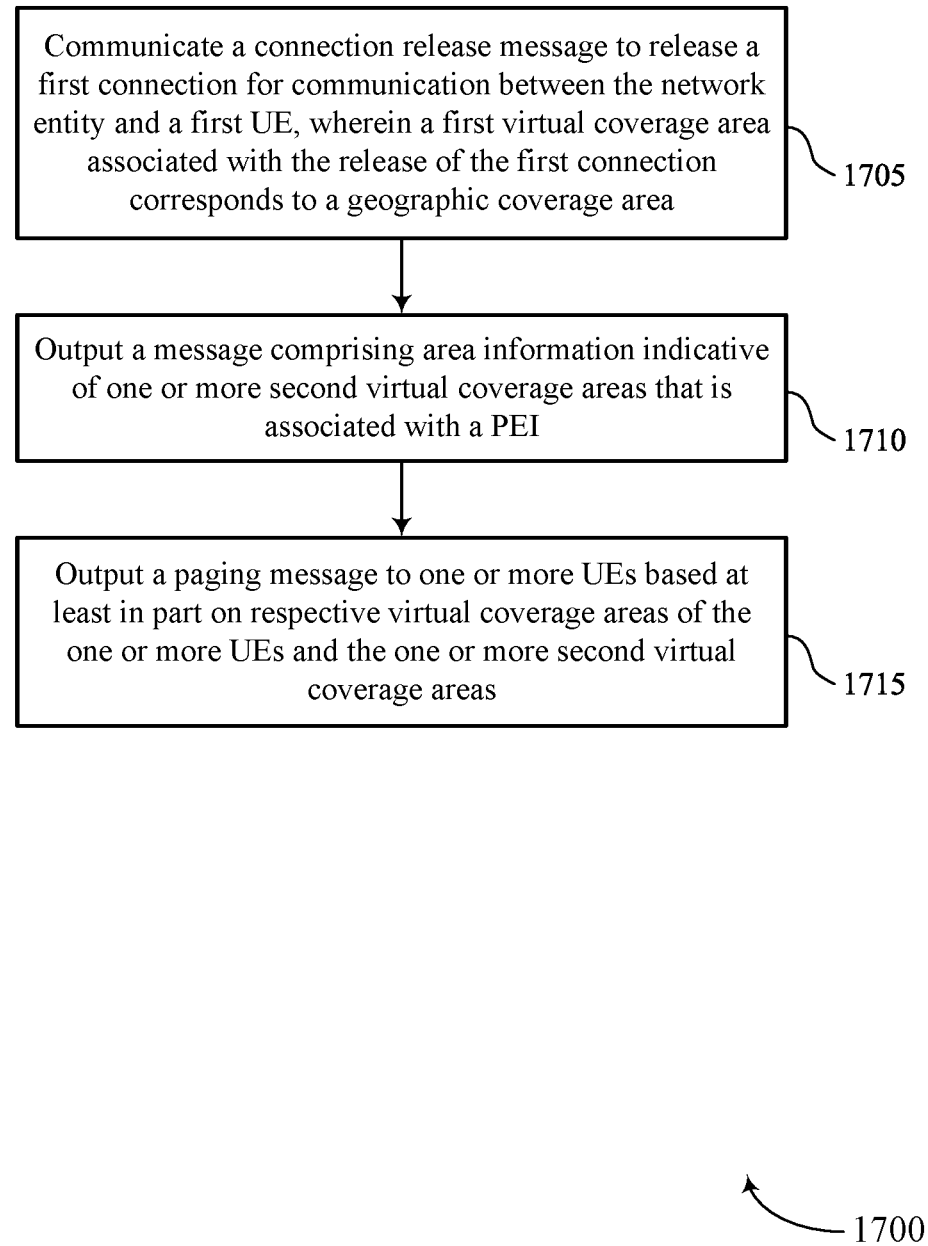

FIG. 17 shows a flowchart illustrating a method 1700 that supports paging message communication in an NTN in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include communicating a connection release message to release a first connection for communication between the network entity and a first UE, where a first virtual coverage area associated with the release of the first connection corresponds to a geographic coverage area. The operations of 1705 may be performed in accordance with examples as disclosed herein. In some examples, aspects of the operations of 1705 may be performed by a connection release component 1225 as described with reference to FIG. 12.

At 1710, the method may include outputting a message including area information indicative of one or more second virtual coverage areas that is associated with a PEI. The operations of 1710 may be performed in accordance with examples as disclosed herein. In some examples, aspects of the operations of 1710 may be performed by a virtual area component 1230 as described with reference to FIG. 12.

At 1715, the method may include outputting a paging message to one or more UEs based on respective virtual coverage areas of the one or more UEs and the one or more second virtual coverage areas. The operations of 1715 may be performed in accordance with examples as disclosed herein. In some examples, aspects of the operations of 1715 may be performed by a paging component 1235 as described with reference to FIG. 12.

Figure 18:
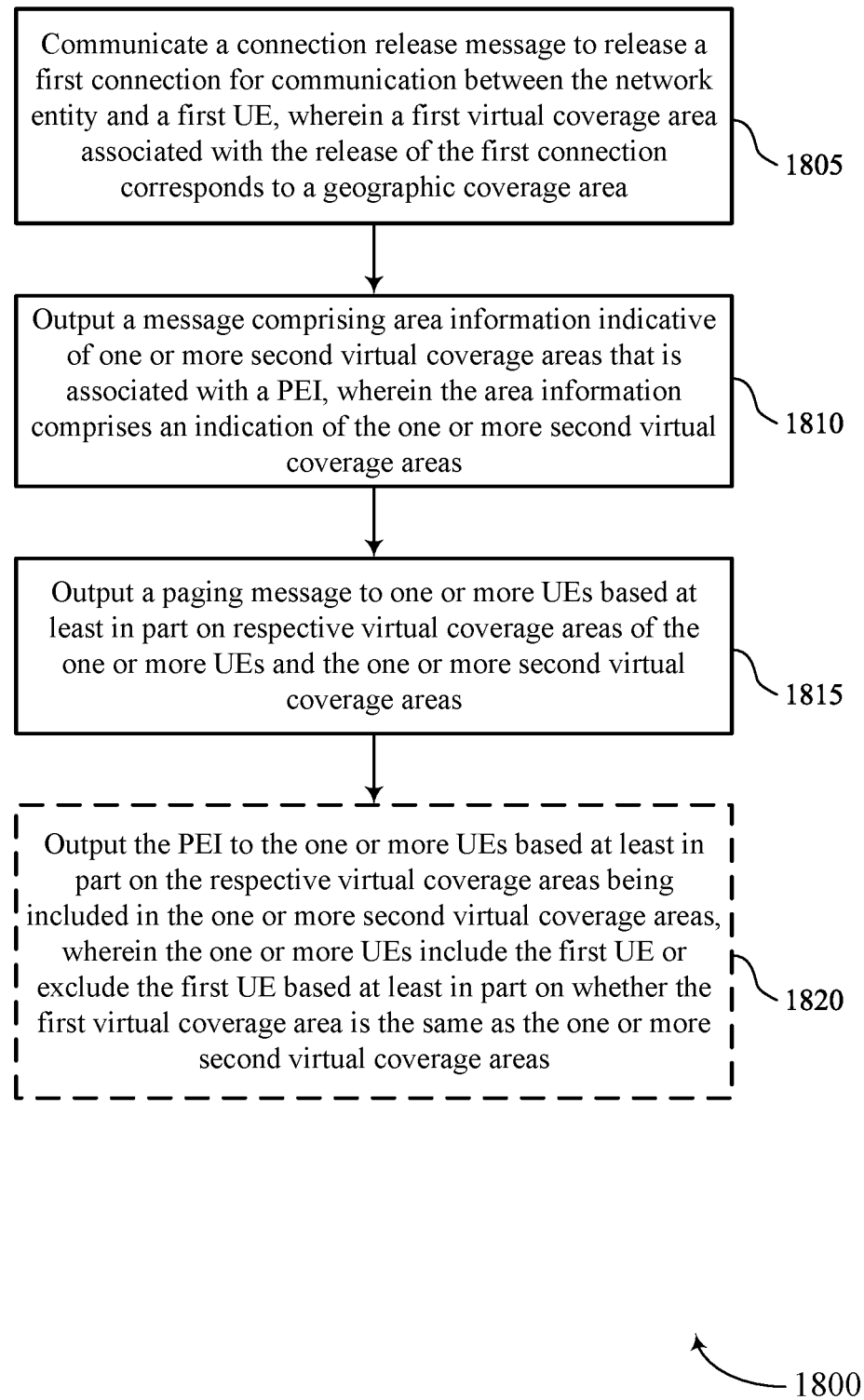

FIG. 18 shows a flowchart illustrating a method 1800 that supports paging message communication in an NTN in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include communicating a connection release message to release a first connection for communication between the network entity and a first UE, where a first virtual coverage area associated with the release of the first connection corresponds to a geographic coverage area. The operations of 1805 may be performed in accordance with examples as disclosed herein. In some examples, aspects of the operations of 1805 may be performed by a connection release component 1225 as described with reference to FIG. 12.

At 1810, the method may include outputting a message including area information indicative of one or more second virtual coverage areas that is associated with a PEI, where the area information includes an indication of the one or more second virtual coverage areas. The operations of 1810 may be performed in accordance with examples as disclosed herein. In some examples, aspects of the operations of 1810 may be performed by a virtual area component 1230 as described with reference to FIG. 12.

At 1815, the method may include outputting a paging message to one or more UEs based on respective virtual coverage areas of the one or more UEs and the one or more second virtual coverage areas. The operations of 1815 may be performed in accordance with examples as disclosed herein. In some examples, aspects of the operations of 1815 may be performed by a paging component 1235 as described with reference to FIG. 12.

At 1820, to support outputting the paging message, the method may include outputting the PEI to the one or more UEs based on the respective virtual coverage areas being included in the one or more second virtual coverage areas, where the one or more UEs include the first UE or exclude the first UE based on whether the first virtual coverage area is the same as the one or more second virtual coverage areas. The operations of 1820 may be performed in accordance with examples as disclosed herein. In some examples, aspects of the operations of 1820 may be performed by a paging component 1235 as described with reference to FIG. 12.

Figure 19:
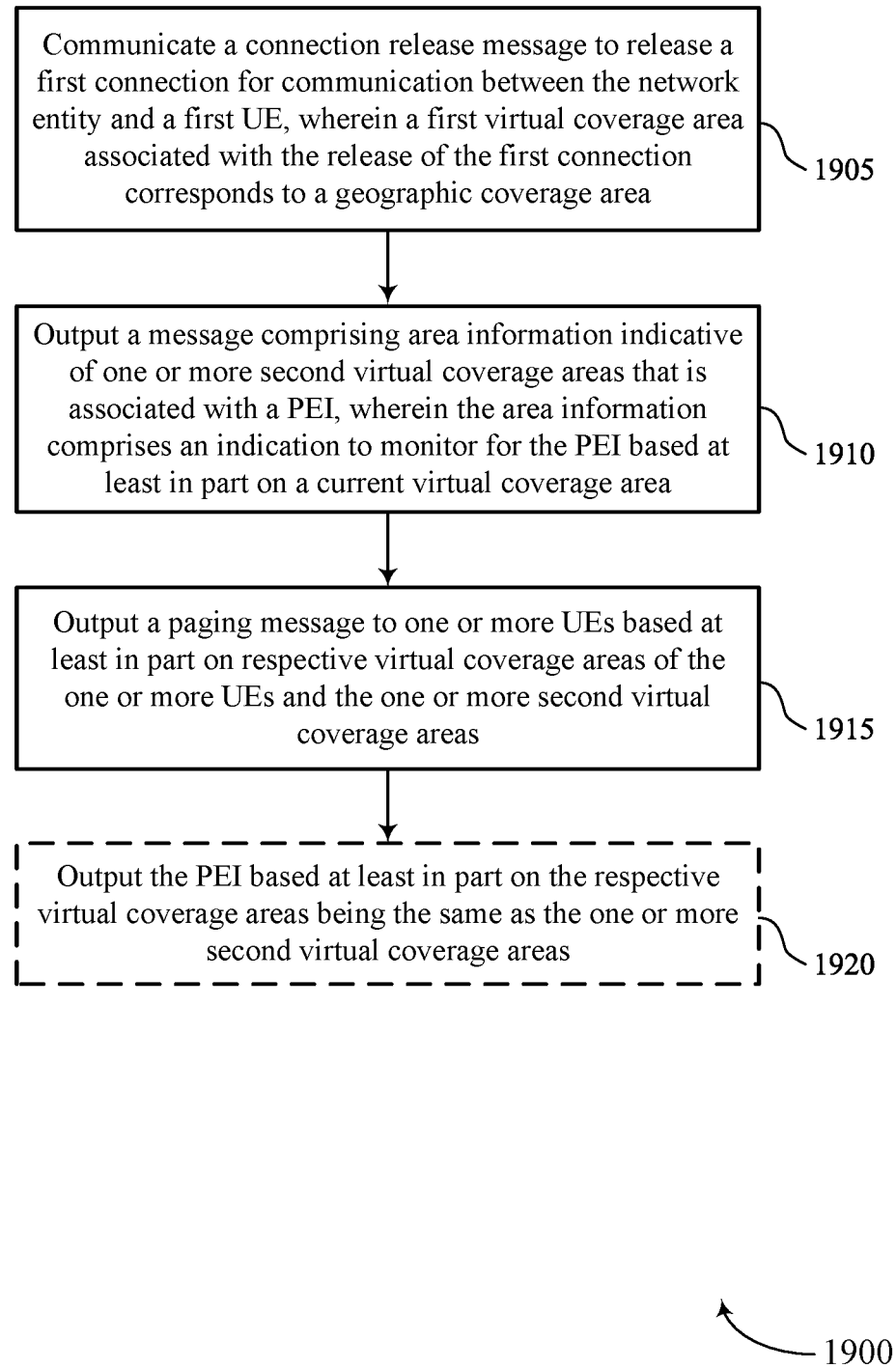

FIG. 19 shows a flowchart illustrating a method 1900 that supports paging message communication in an NTN in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include communicating a connection release message to release a first connection for communication between the network entity and a first UE, where a first virtual coverage area associated with the release of the first connection corresponds to a geographic coverage area. The operations of 1905 may be performed in accordance with examples as disclosed herein. In some examples, aspects of the operations of 1905 may be performed by a connection release component 1225 as described with reference to FIG. 12.

At 1910, the method may include outputting a message including area information indicative of one or more second virtual coverage areas that is associated with a PEI, wherein the area information includes an indication to monitor for the PEI based on a current virtual coverage area. The operations of 1910 may be performed in accordance with examples as disclosed herein. In some examples, aspects of the operations of 1910 may be performed by a virtual area component 1230 as described with reference to FIG. 12.

At 1915, the method may include outputting a paging message to one or more UEs based on respective virtual coverage areas of the one or more UEs and the one or more second virtual coverage areas. The operations of 1915 may be performed in accordance with examples as disclosed herein. In some examples, aspects of the operations of 1915 may be performed by a paging component 1235 as described with reference to FIG. 12.

At 1920, to support outputting the paging message, the method may include outputting the PEI based on the respective virtual coverage areas being the same as the one or more second virtual coverage areas. The operations of 1920 may be performed in accordance with examples as disclosed herein. In some examples, aspects of the operations of 1920 may be performed by a paging component 1235 as described with reference to FIG. 12.

The following provides an overview of aspects of the present disclosure:

Aspect 1: A method for wireless communication at a UE, comprising: communicating a connection release message to release a first connection for the UE, wherein a geographic location of the UE associated with the release of the first connection corresponds to a first virtual coverage area associated with a geographic coverage area; obtaining a message comprising area information indicative of one or more second virtual coverage areas that is associated with a PEI for one or more paging occasions associated with the one or more second virtual coverage areas; and monitoring for a paging message based at least in part on the first virtual coverage area of the UE and the one or more second virtual coverage areas.

Aspect 2: The method of aspect 1, wherein the area information comprises an indication of the one or more second virtual coverage areas, and wherein monitoring for the paging message comprises: monitoring for the PEI based at least in part on the first virtual coverage area being included in the one or more second virtual coverage areas.

Aspect 3: The method of aspect 1, wherein the area information comprises an indication of the one or more second virtual coverage areas, and wherein monitoring for the paging message comprises: monitoring for DCI associated with a paging occasion based at least in part on the first virtual coverage area being excluded from the one or more second virtual coverage areas.

Aspect 4: The method of any of aspects 1 through 2, wherein the area information comprises an indication to monitor for the PEI based at least in part on a current virtual coverage area of the UE, and wherein monitoring for the paging message comprises: monitoring for the PEI based at least in part on the first virtual coverage area being the same as the one or more second virtual coverage areas, the one or more second virtual coverage areas corresponding to a current geographic location of the UE.

Aspect 5: The method of any of aspects 1 and 3, wherein the area information comprises an indication to monitor for the PEI based at least in part on a current virtual coverage area of the UE, and wherein monitoring for the paging message comprises: monitoring for DCI associated with a paging occasion based at least in part on the first virtual coverage area being different than the one or more second virtual coverage areas, the one or more second virtual coverage areas corresponding to a current geographic location of the UE.

Aspect 6: The method of any of aspects 1 through 5, wherein the area information comprises a last-used-virtual-coverage-area-only indication associated with the PEI, and wherein monitoring for the paging message comprises: monitoring for the PEI or DCI associated with a paging occasion based at least in part on the last-used-virtual-coverage-area-only indication and whether the first virtual coverage area is the same as the one or more second virtual coverage areas, the one or more second virtual coverage areas corresponding to a current geographic location of the UE.

Aspect 7: The method of any of aspects 1 through 6, wherein monitoring for the paging message comprises: monitoring for the PEI or DCI associated with a paging occasion based at least in part on whether a first index of the first virtual coverage area corresponds to a second index associated with the one or more second virtual coverage areas.

Aspect 8: The method of any of aspects 1 through 7, wherein at least one of the first virtual coverage area of the UE and the one or more second virtual coverage areas are determined using a function that maps geographic locations to a respective virtual coverage area.

Aspect 9: The method of aspect 8, further comprising: obtaining a control message that indicates the function that maps geographic locations to the respective virtual coverage area.

Aspect 10: The method of any of aspects 1 through 9, further comprising: establishing a second connection for the UE, wherein the area information is obtained based at least in part on the establishment of the second connection.

Aspect 11: The method of any of aspects 1 through 10, wherein the first virtual coverage area is a first virtual cell or a first virtual beam; and the one or more second virtual coverage areas are one or more second virtual cells or one or more second virtual beams.

Aspect 12: The method of any of aspects 1 through 11, wherein monitoring for the paging message comprises: monitoring for a WUS based at least in part on the first virtual coverage area being included in the one or more second virtual coverage areas.

Aspect 13: The method of any of aspects 1 through 12, wherein the message comprising the area information is a broadcast message.

Aspect 14: The method of any of aspects 1 through 12, wherein the message comprising the area information is a multicast message.

Aspect 15: A method for wireless communication at a network entity, comprising: communicating a connection release message to release a first connection for communication between the network entity and a first UE, wherein a first virtual coverage area associated with the release of the first connection corresponds to a geographic coverage area; outputting a message comprising area information indicative of one or more second virtual coverage areas that is associated with a PEI; and outputting a paging message to one or more UEs based at least in part on respective virtual coverage areas of the one or more UEs and the one or more second virtual coverage areas.

Aspect 16: The method of aspect 15, wherein the area information comprises an indication of the one or more second virtual coverage areas, and wherein outputting the paging message comprises: outputting the PEI to the one or more UEs based at least in part on the respective virtual coverage areas being included in the one or more second virtual coverage areas, wherein the one or more UEs include the first UE or exclude the first UE based at least in part on whether the first virtual coverage area is the same as the second virtual coverage area.

Aspect 17: The method of aspect 15, wherein the area information comprises an indication of the one or more second virtual coverage areas, and wherein outputting the paging message comprises: outputting DCI associated with a paging occasion to the one or more UEs based at least in part on the respective virtual coverage areas being excluded from the one or more second virtual coverage areas.

Aspect 18: The method of any of aspects 15 through 16, wherein the area information comprises an indication to monitor for the PEI based at least in part on a current virtual coverage area, and wherein outputting the paging message comprises: outputting the PEI based at least in part on the respective virtual coverage areas being the same as the one or more second virtual coverage areas.

Aspect 19: The method of any of aspects 15 and 17, wherein the area information comprises an indication to monitor for the PEI based at least in part on a current virtual coverage area, and wherein outputting the paging message comprises: outputting DCI associated with a paging occasion based at least in part on the respective virtual coverage areas being different than the one or more second virtual coverage areas.

Aspect 20: The method of any of aspects 15 through 19, wherein the area information comprises a last-used-virtual-coverage-area-only indication associated with the PEI, and wherein outputting the paging message comprises: outputting the PEI or DCI associated with a paging occasion based at least in part on the last-used-virtual-coverage-area-only indication and whether the respective virtual coverage areas are the same as the one or more second virtual coverage areas.

Aspect 21: The method of any of aspects 15 through 20, wherein outputting the paging message comprises: outputting the PEI or DCI associated with a paging occasion based at least in part on whether a first index of the respective virtual coverage areas corresponds to a second index associated with the one or more second virtual coverage areas.

Aspect 22: The method of any of aspects 15 through 21, wherein at least one of the respective virtual coverage areas of the one or more UEs and the one or more second virtual coverage areas are determined using a function that maps geographic locations to virtual coverage areas.

Aspect 23: The method of any of aspects 15 through 22, further comprising: outputting, to the first UE, the one or more UEs, or both, a control message that indicates a function that maps geographic locations to virtual coverage areas.

Aspect 24: The method of any of aspects 15 through 23, further comprising: outputting an indication of a geographic location of the first UE to a second network entity.

Aspect 25: The method of any of aspects 15 through 24, wherein outputting the paging message comprises: outputting a WUS based at least in part on the respective virtual coverage areas being included in the one or more second virtual coverage areas.

Aspect 26: The method of any of aspects 15 through 25, wherein the respective virtual coverage areas are virtual cells or virtual beams; and the one or more second virtual coverage areas are one or more second virtual cells or one or more second virtual beams.

Aspect 27: The method of any of aspects 15 through 26, wherein the message comprising the area information is a broadcast message.

Aspect 28: The method of any of aspects 15 through 26, wherein the message comprising the area information is a multicast message.

Aspect 29: An apparatus for wireless communication at a UE, comprising a processor; and memory coupled with the processor, the processor configured to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; and memory coupled with the processor, the processor configured to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more memories; and
one or more processors coupled with the one or more memories and configured to cause the UE to:
communicate a connection release message to release a first connection between the UE and a network entity, wherein a geographic location of the UE associated with the release of the first connection corresponds to a first virtual coverage area associated with a geographic coverage area;
obtain area information comprising an indication of one or more second virtual coverage areas that are associated with a paging early indication for one or more paging occasions associated with the one or more second virtual coverage areas; and
monitor for the paging early indication based at least in part on the first virtual coverage area of the UE that is included in the one or more second virtual coverage areas.

2. The apparatus of claim 1, wherein the area information comprises an indication to monitor for the paging early indication based at least in part on a current virtual coverage area of the UE, and wherein, to monitor for the paging early indication, the one or more processors are configured to cause the UE to:
monitor for the paging early indication based at least in part on the first virtual coverage area that is the same as the one or more second virtual coverage areas, wherein the one or more second virtual coverage areas correspond to a current geographic location of the UE.

3. The apparatus of claim 1, wherein the area information comprises an indication to monitor for the paging early indication based at least in part on a current virtual coverage area of the UE, and wherein, to monitor for the paging early indication, the one or more processors are configured to cause the UE to:
monitor for downlink control information associated with a paging occasion based at least in part on the first virtual coverage area that is different than the one or more second virtual coverage areas, wherein the one or more second virtual coverage areas correspond to a current geographic location of the UE.

4. The apparatus of claim 1, wherein the area information comprises a last-used-virtual-coverage-area-only indication associated with the paging early indication, and wherein, to monitor for the paging early indication, the one or more processors are configured to cause the UE to:
monitor for downlink control information associated with a paging occasion based at least in part on the last-used-virtual-coverage-area-only indication and whether the first virtual coverage area is the same as the one or more second virtual coverage areas, wherein the one or more second virtual coverage areas correspond to a current geographic location of the UE.

5. The apparatus of claim 1, wherein, to monitor for the paging early indication, the one or more processors are configured to cause the UE to:
monitor for or downlink control information associated with a paging occasion based at least in part on whether a first index of the first virtual coverage area corresponds to a second index associated with the one or more second virtual coverage areas.

6. The apparatus of claim 1, wherein at least one of the first virtual coverage area of the UE and the one or more second virtual coverage areas is determined via use of a function that maps geographic locations to the at least one of the first virtual coverage area of the UE and the one or more second virtual coverage areas.

7. The apparatus of claim 6, further comprising:
one or more antennas, wherein the one or more antennas and the one or more processors are configured to cause the UE to:
obtain a control message that indicates the function.

8. The apparatus of claim 1, wherein the one or more processors are configured to cause the UE to:
establish a second connection for the UE, wherein the area information is obtained based at least in part on the establishment of the second connection.

9. The apparatus of claim 1, wherein:
the first virtual coverage area is a first virtual cell or a first virtual beam; and
the one or more second virtual coverage areas are one or more second virtual cells or one or more second virtual beams.

10. The apparatus of claim 1, wherein, to monitor for the paging early indication, the one or more processors are configured to cause the UE to:
monitor for a wake-up signal based at least in part on the first virtual coverage area that is included in the one or more second virtual coverage areas.

11. The apparatus of claim 1, wherein the area information is included in a broadcast message.

12. The apparatus of claim 1, wherein the area information is included in a multicast message.

13. An apparatus for wireless communication at a network entity, comprising:
one or more memories; and
one or more processors coupled with the one or more memories and configured to cause the network entity to:
communicate a connection release message to release a first connection for communication between the network entity and a first user equipment (UE), wherein a first virtual coverage area associated with the release of the first connection corresponds to a geographic coverage area;
output area information comprising an indication of one or more second virtual coverage areas that are associated with a paging early indication; and
output the paging early indication to one or more UEs based at least in part on a respective virtual coverage area of each of the one or more UEs that is included in the one or more second virtual coverage areas.

14. The apparatus of claim 13,
wherein the one or more UEs include the first UE or exclude the first UE based at least in part on whether the first virtual coverage area is included in the one or more second virtual coverage areas.

15. The apparatus of claim 13, wherein the area information comprises an indication to monitor for the paging early indication based at least in part on a current virtual coverage area, and wherein, to output the paging early indication, the one or more processors are configured to cause the network entity to:
output the paging early indication based at least in part on the respective virtual coverage area of each of the one or more UEs that is the same as the one or more second virtual coverage areas.

16. The apparatus of claim 13, wherein the area information comprises an indication to monitor for the paging early indication based at least in part on a current virtual coverage area, and wherein, to output the paging early indication, the one or more processors are configured to cause the network entity to:

output downlink control information associated with a paging occasion based at least in part on the respective virtual coverage area of each of the one or more UEs that is different than the one or more second virtual coverage areas.

17. The apparatus of claim 13, wherein the area information comprises a last-used-virtual-coverage-area-only indication associated with the paging early indication, and wherein, to output the paging early indication, the one or more processors are configured to cause the network entity to:
output downlink control information associated with a paging occasion based at least in part on the last-used-virtual-coverage-area-only indication and whether the respective virtual coverage area of each of the one or more UEs is the same as the one or more second virtual coverage areas.

18. The apparatus of claim 13, wherein, to output the paging early indication, the one or more processors are configured to cause the network entity to:
output downlink control information associated with a paging occasion based at least in part on whether a first index of the respective virtual coverage area of each of the one or more UEs corresponds to a second index associated with the one or more second virtual coverage areas.

19. The apparatus of claim 13, wherein at least one respective virtual coverage area of the one or more UEs and the one or more second virtual coverage areas is determined via use of a function that maps geographic locations to the at least one respective virtual coverage area and the one or more second virtual coverage areas.

20. The apparatus of claim 19, further comprising:
one or more antennas, wherein the one or more antennas and the one or more processors are configured to cause the network entity to:
output, to the first UE, the one or more UEs, or both, a control message that indicates the function.

21. The apparatus of claim 13, wherein the one or more processors are configured to cause the network entity to:
output an indication of a geographic location of the first UE to a second network entity.

22. The apparatus of claim 13, wherein, to output the paging early indication, the one or more processors are configured to cause the network entity to:
output a wake-up signal based at least in part on the respective virtual coverage area of each of the one or more UEs that is included in the one or more second virtual coverage areas.

23. The apparatus of claim 13, wherein:
the respective virtual coverage area is a virtual cell or a virtual beam; and
the one or more second virtual coverage areas are one or more second virtual cells or one or more second virtual beams.

24. The apparatus of claim 13, wherein the area information is included in a broadcast message.

25. The apparatus of claim 13, wherein the area information is included in a multicast message.

26. The apparatus of claim 13, wherein the one or more UEs include the first UE.

27. A method for wireless communication at a user equipment (UE), comprising:
communicating a connection release message to release a first connection between the UE and a network entity, wherein a geographic location of the UE associated with the release of the first connection corresponds to a first virtual coverage area associated with a geographic coverage area;

obtaining area information comprising an indication of one or more second virtual coverage areas that are associated with a paging early indication for one or more paging occasions associated with the one or more second virtual coverage areas; and monitoring for the paging early indication based at least in part on the first virtual coverage area of the UE that is included in the one or more second virtual coverage areas.

28. The method of claim 27, wherein the area information comprises an indication to monitor for the paging early indication based at least in part on a current virtual coverage area of the UE, and wherein monitoring for the paging early indication comprises:

monitoring for the paging early indication based at least in part on the first virtual coverage area that is the same as the one or more second virtual coverage areas, wherein the one or more second virtual coverage areas correspond to a current geographic location of the UE.

29. The method of claim 27, wherein the area information comprises an indication to monitor for the paging early indication based at least in part on a current virtual coverage area of the UE, and wherein monitoring for the paging early indication comprises:

monitoring for downlink control information associated with a paging occasion based at least in part on the first virtual coverage area that is different than the one or more second virtual coverage areas, wherein the one or more second virtual coverage areas correspond to a current geographic location of the UE.

30. The method of claim 27, wherein the area information comprises a last-used-virtual-coverage-area-only indication associated with the paging early indication, and wherein monitoring for the paging early indication comprises:

monitoring for downlink control information associated with a paging occasion based at least in part on the last-used-virtual-coverage-area-only indication and whether the first virtual coverage area is the same as the one or more second virtual coverage areas, wherein the one or more second virtual coverage areas correspond to a current geographic location of the UE.

31. The method of claim 27, wherein monitoring for the paging early indication comprises:

monitoring for downlink control information associated with a paging occasion based at least in part on whether a first index of the first virtual coverage area corresponds to a second index associated with the one or more second virtual coverage areas.

32. The method of claim 27, wherein at least one of the first virtual coverage area of the UE and the one or more second virtual coverage areas is determined via use of a function that maps geographic locations to the at least one of the first virtual coverage area of the UE and the one or more second virtual coverage areas.

33. The method of claim 32, further comprising:
receiving a control message that indicates the function.

34. A method for wireless communication at a network entity, comprising:

communicating a connection release message to release a first connection for communication between the network entity and a first user equipment (UE), wherein a first virtual coverage area associated with the release of the first connection corresponds to a geographic coverage area;

outputting area information comprising an indication of one or more second virtual coverage areas that are associated with a paging early indication; and outputting the paging early indication to one or more UEs based at least in part on a respective virtual coverage area of each of the one or more UEs that is included in the one or more second virtual coverage areas.

35. The method of claim 34, wherein outputting the paging early indication comprises:

outputting downlink control information associated with a paging occasion based at least in part on the respective virtual coverage area of each of the one or more UEs that is different than the one or more second virtual coverage areas.

36. A non-transitory computer-readable medium storing code for wireless communication at a user equipment (UE), the code comprising instructions executable by one or more processors to cause the UE to:

communicate a connection release message to release a first connection between the UE and a network entity, wherein a geographic location of the UE associated with the release of the first connection corresponds to a first virtual coverage area associated with a geographic coverage area;

obtain area information comprising an indication of one or more second virtual coverage areas that are associated with a paging early indication for one or more paging occasions associated with the one or more second virtual coverage areas; and monitor for the paging early indication based at least in part on the first virtual coverage area of the UE that is included in the one or more second virtual coverage areas.

37. A non-transitory computer-readable medium storing code for wireless communication at a network entity, the code comprising instructions executable by one or more processors to cause the network entity to:

communicate a connection release message to release a first connection for communication between the network entity and a first user equipment (UE), wherein a first virtual coverage area associated with the release of the first connection corresponds to a geographic coverage area;

output area information comprising an indication of one or more second virtual coverage areas that are associated with a paging early indication; and output the paging early indication to one or more UEs based at least in part on a respective virtual coverage area of each of the one or more UEs that is included in the one or more second virtual coverage areas.

\* \* \* \* \*